United States Patent [19]
Kamo

[11] Patent Number: 5,359,377
[45] Date of Patent: Oct. 25, 1994

[54] REAL IMAGE TYPE VARIABLE MAGNIFICATION VIEW-FINDER OPTICAL SYSTEM

[75] Inventor: Yuji Kamo, Hino, Japan

[73] Assignee: Olympus Optical Co., Ltd., Tokyo, Japan

[21] Appl. No.: 128,200

[22] Filed: Sep. 29, 1993

[30] Foreign Application Priority Data

Sep. 30, 1992 [JP] Japan .................... 4-261855

[51] Int. Cl.$^5$ .............................. G03B 13/10
[52] U.S. Cl. .................... 354/222; 359/676
[58] Field of Search ............ 354/222; 359/676, 725, 359/643

[56] References Cited

U.S. PATENT DOCUMENTS 4,955,715  9/1990  Kitagishi .................... 354/222
5,055,868 10/1991  Itoh et al. .................... 354/222

FOREIGN PATENT DOCUMENTS 3180825  8/1991  Japan .
4113341  4/1992  Japan .

*Primary Examiner*—David M. Gray
*Attorney, Agent, or Firm*—Cushman, Darby & Cushman

[57] ABSTRACT

A real image type variable magnification view-finder optical system consisting of an objective lens system which comprises a plurality of lens units and has a positive refractive power as a whole, and an eyepiece lens system for allowing observation of an image formed by the objective lens system. At least one of the plurality of lens units comprises two or more lens components and is configured so as to permit varying one or more airspaces reserved between the at least two lens components. This real image type variable magnification view-finder optical system is capable of switching a visual field thereof for a usual photographing mode to another visual field for a panoramic photographing mode.

8 Claims, 42 Drawing Sheets

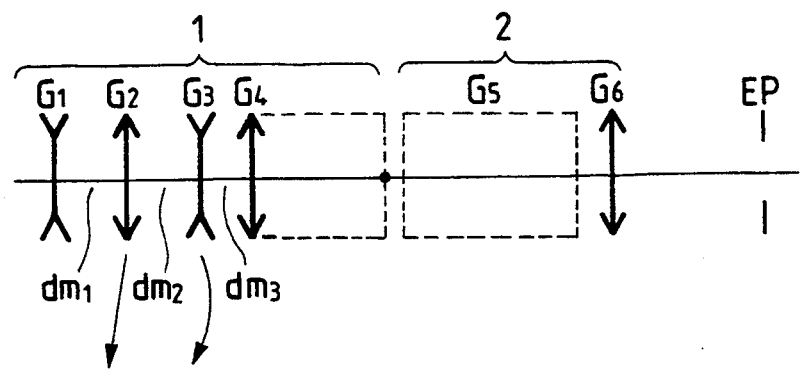
FIG. 1
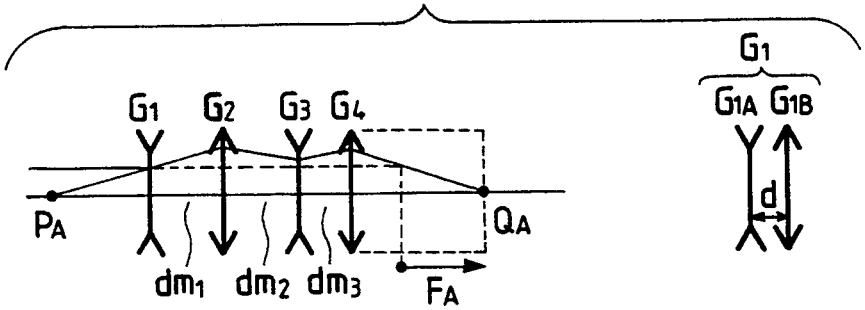
FIG. 2A
FIG. 2B
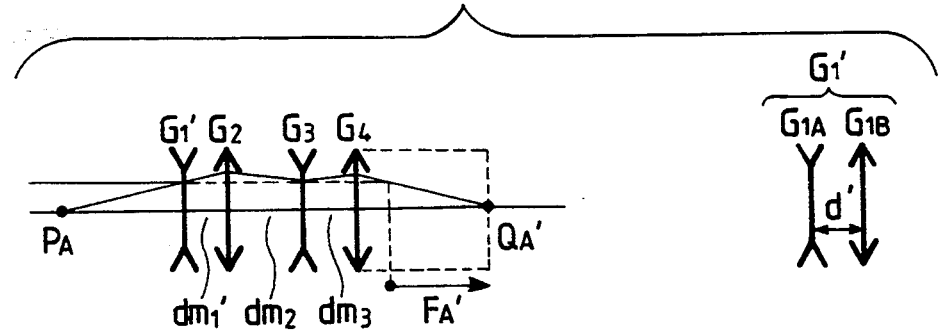
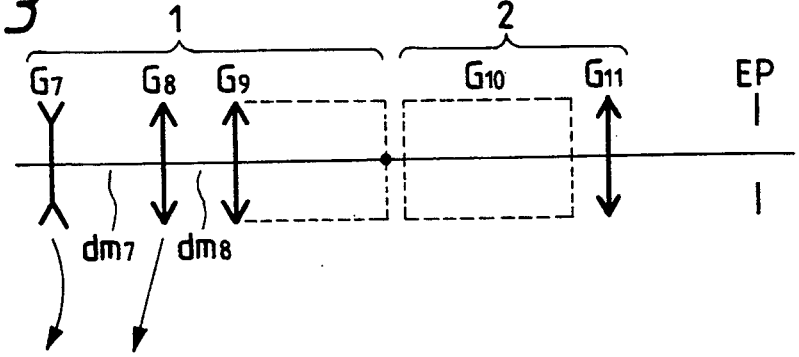
FIG. 3

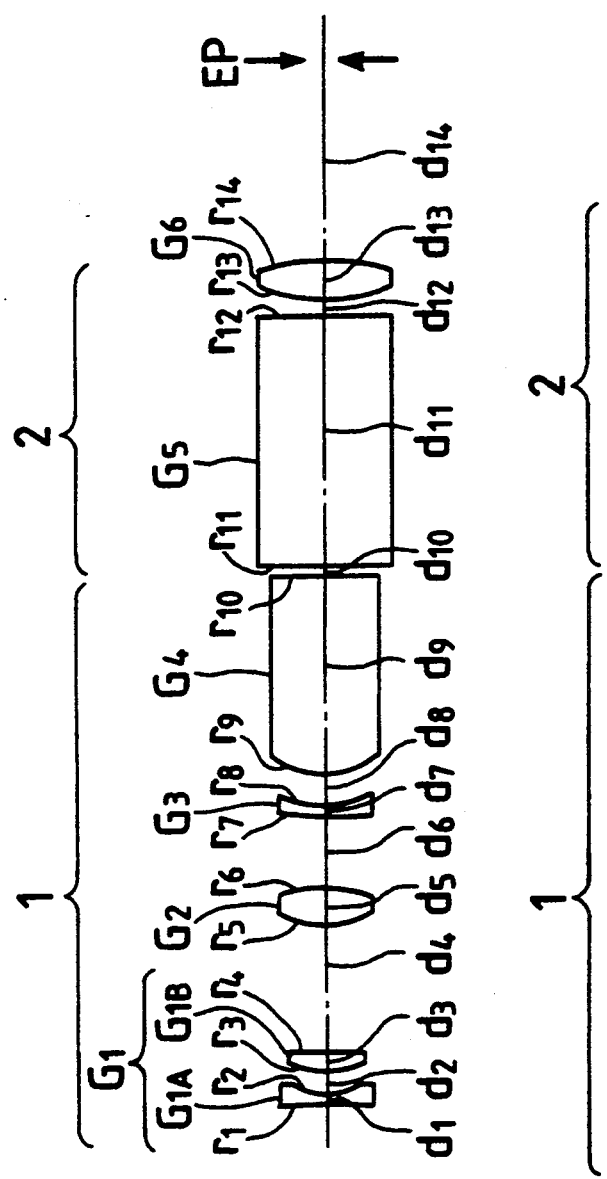
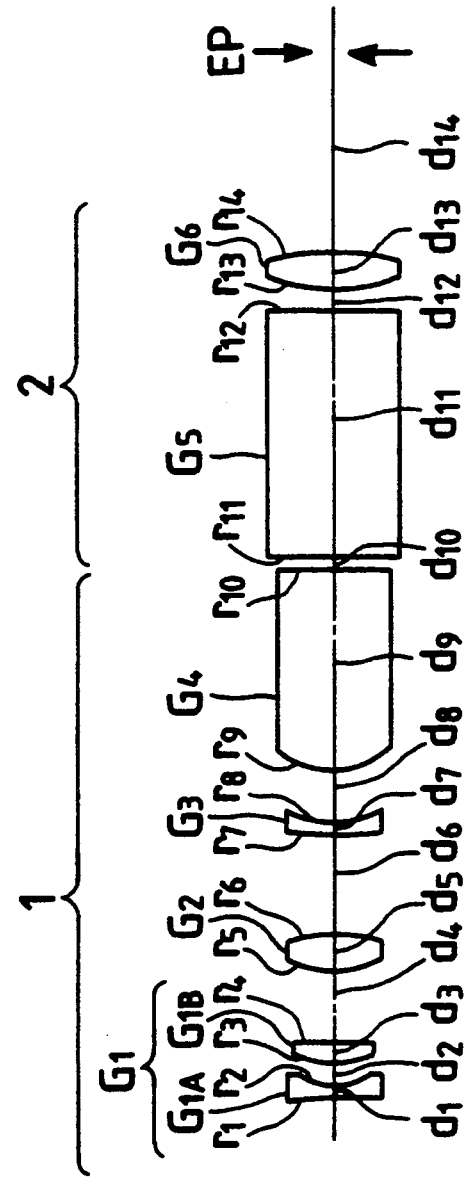
FIG. 7A
FIG. 7B

PUPIL DIA.=2.0mm

-1.5 -0.5 +0.5

ω=24.91°

-1.5 -0.5 +0.5

ω=24.91°

-10. (%) 10.

PUPIL DIA.=2.0mm

-1.5 -0.5 +0.5

ω=19.46°

-1.5 -0.5 +0.5

ω=19.46°

-10. (%) 10.

PUPIL DIA.=2.0mm

-1.5 -0.5 +0.5

ω=14.22°

-1.5 -0.5 +0.5

ω=14.22°

-10. (%) 10.

PUPIL DIA.=2.0mm

-1.5 -0.5 +0.5

ω=23.10°

-1.5 -0.5 +0.5

ω=23.10°

-10. (%) 10.

PUPIL DIA.=2.0mm

-1.5 -0.5 +0.5

ω=17.94°

-1.5 -0.5 +0.5

ω=17.94°

-10. (%) 10.

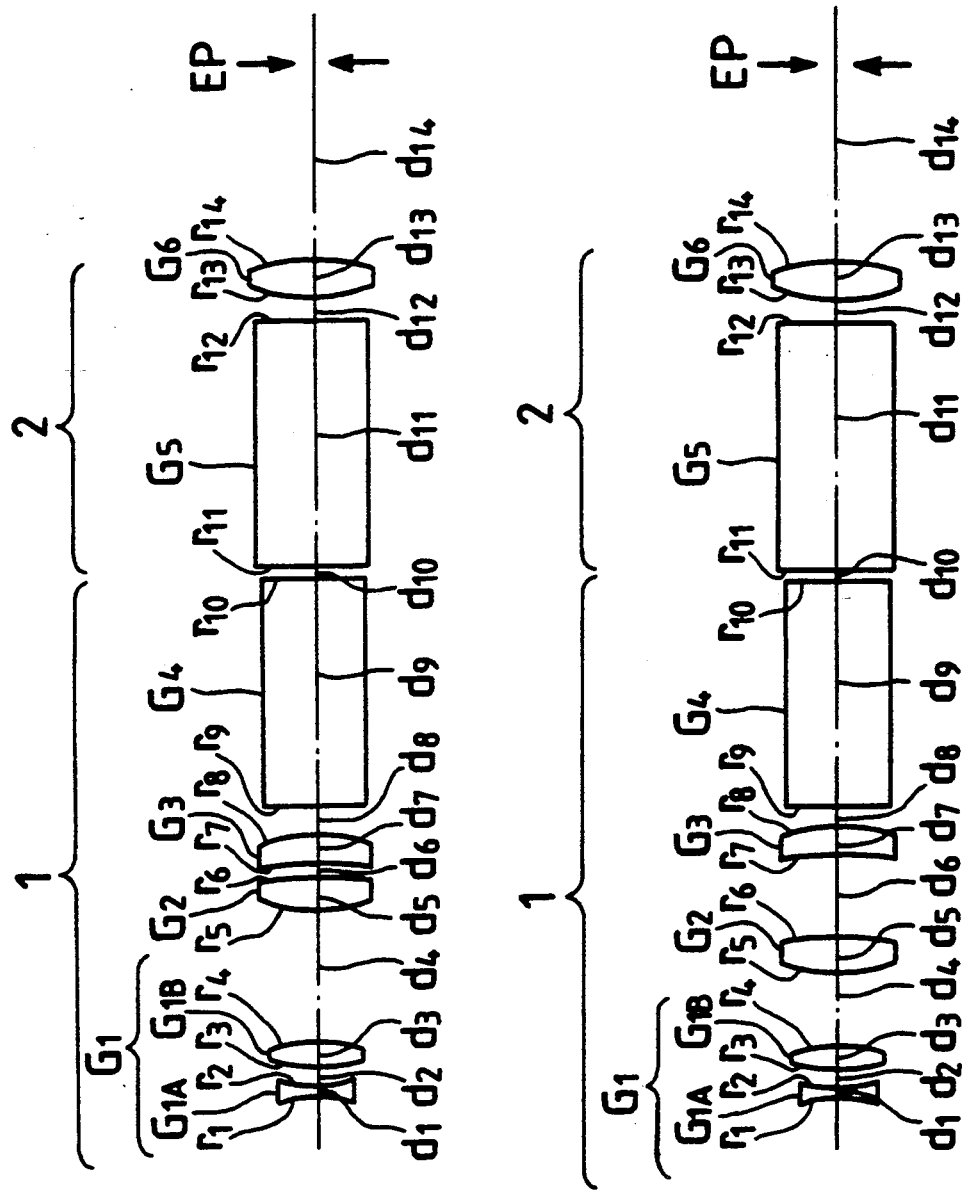

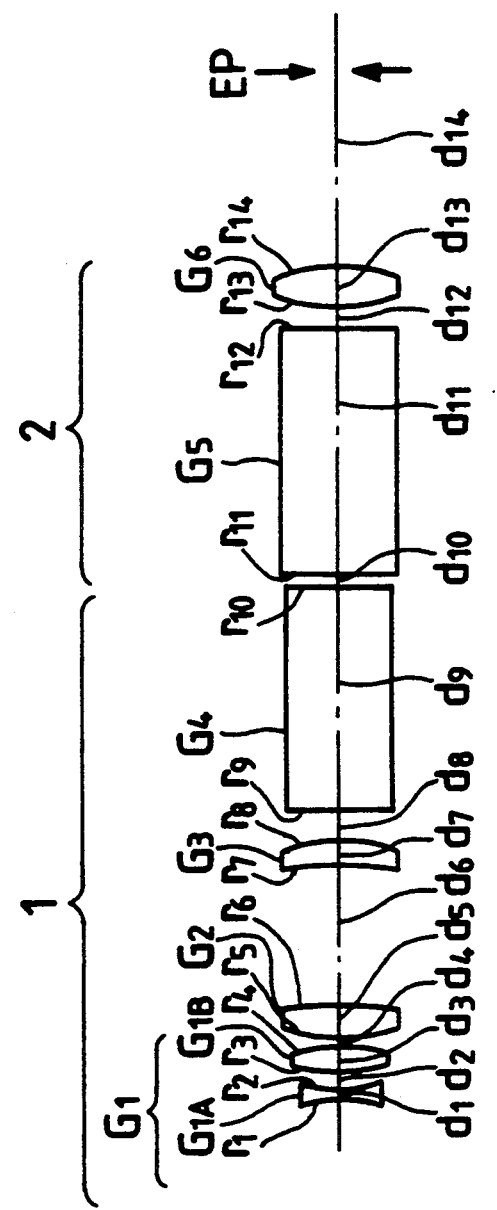
FIG. IIC

PUPIL DIA.=2.0mm

-1.5 -0.5 +0.5

ω=24.37°

-1.5 -0.5 +0.5

ω=24.37°

-10. (%) 10.

PUPIL DIA.=2.0mm

-1.5 -0.5 +0.5

ω=18.15°

-1.5 -0.5 +0.5

ω=18.15°

-10. (%) 10.

PUPIL DIA.=2.0mm

ω=12.97°

ω=12.97°

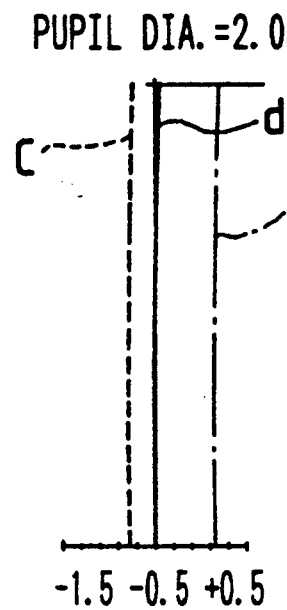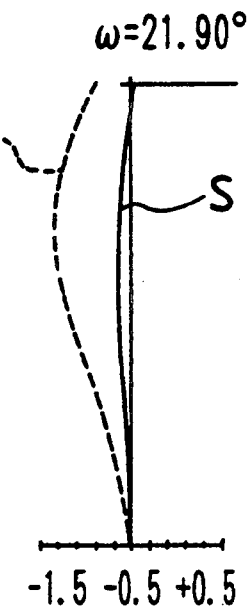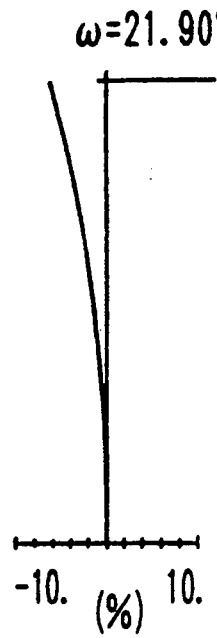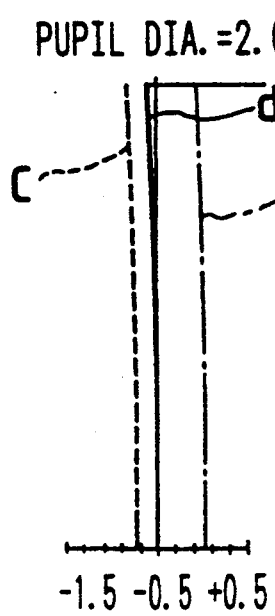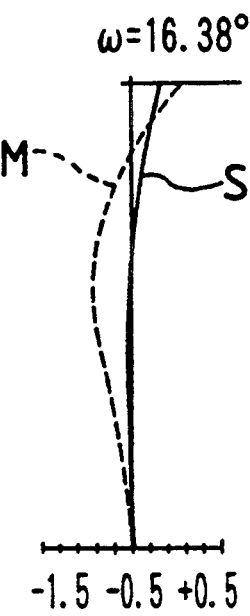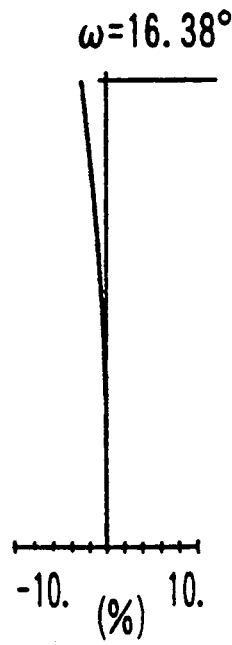

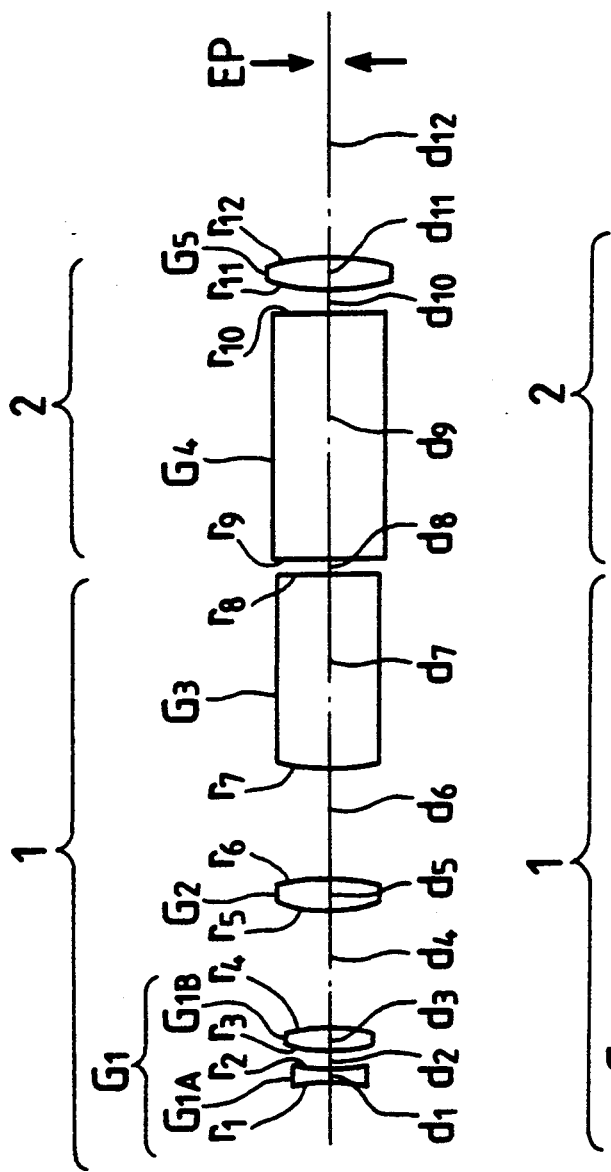
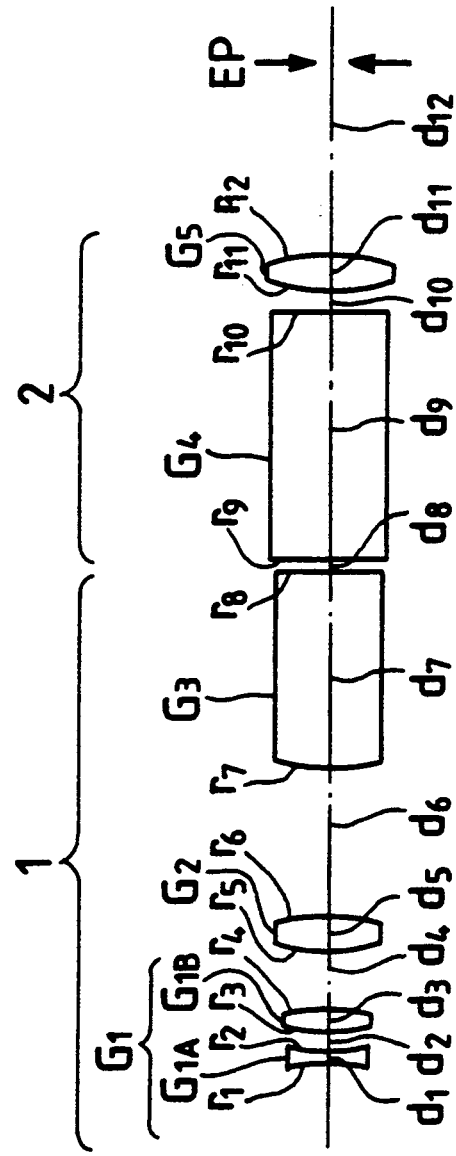
FIG. 15A
FIG. 15B

FIG. 16A
PUPIL DIA.=2.0mm
FIG. 16B
ω=24.57°
FIG. 16C
ω=24.57°
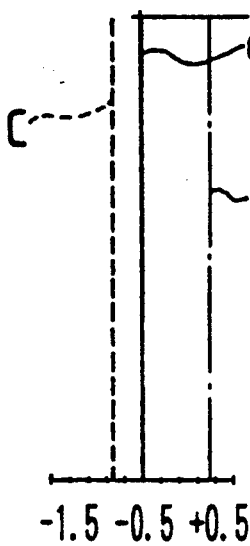
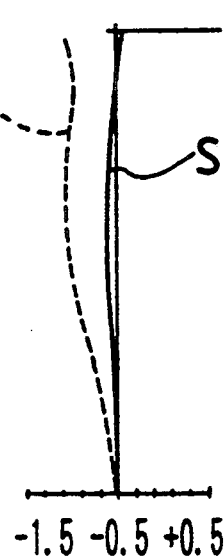
FIG. 16D
PUPIL DIA.=2.0mm
FIG. 16E
ω=18.64°
FIG. 16F
ω=18.64°
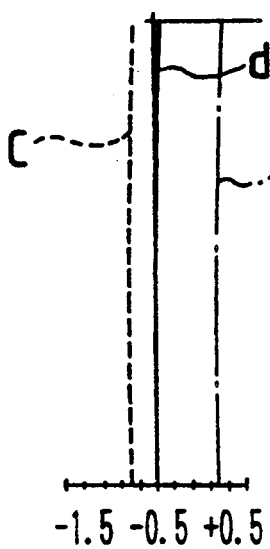
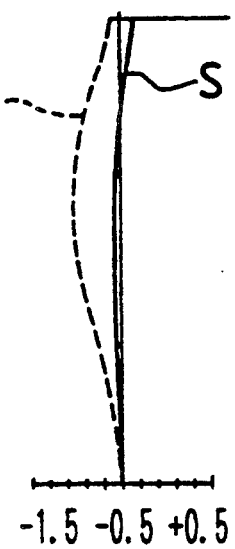
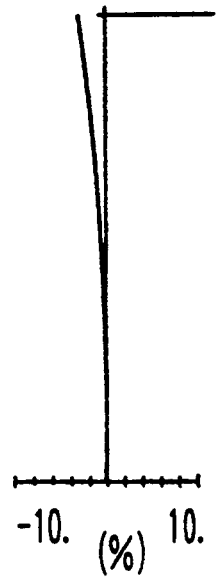

PUPIL DIA.=2.0mm

ω=13.94°

ω=13.94°

PUPIL DIA.=2.0mm

-1.5 -0.5 +0.5

ω=20.32°

-1.5 -0.5 +0.5

ω=20.32°

-10. (%) 10.

PUPIL DIA.=2.0mm

-1.5 -0.5 +0.5

ω=14.55°

-1.5 -0.5 +0.5

ω=14.55°

-10. (%) 10.

PUPIL DIA.=2.0mm
-1.5 -0.5 +0.5

ω=22.69°
-1.5 -0.5 +0.5

ω=22.69°
-10. (%) 10.

PUPIL DIA.=2.0mm
-1.5 -0.5 +0.5

ω=17.15°
-1.5 -0.5 +0.5

ω=17.15°
-10. (%) 10.

PUPIL DIA.=2.0mm

ω=20.23°

ω=20.23°

PUPIL DIA.=2.0mm

ω=15.45°

ω=15.45°

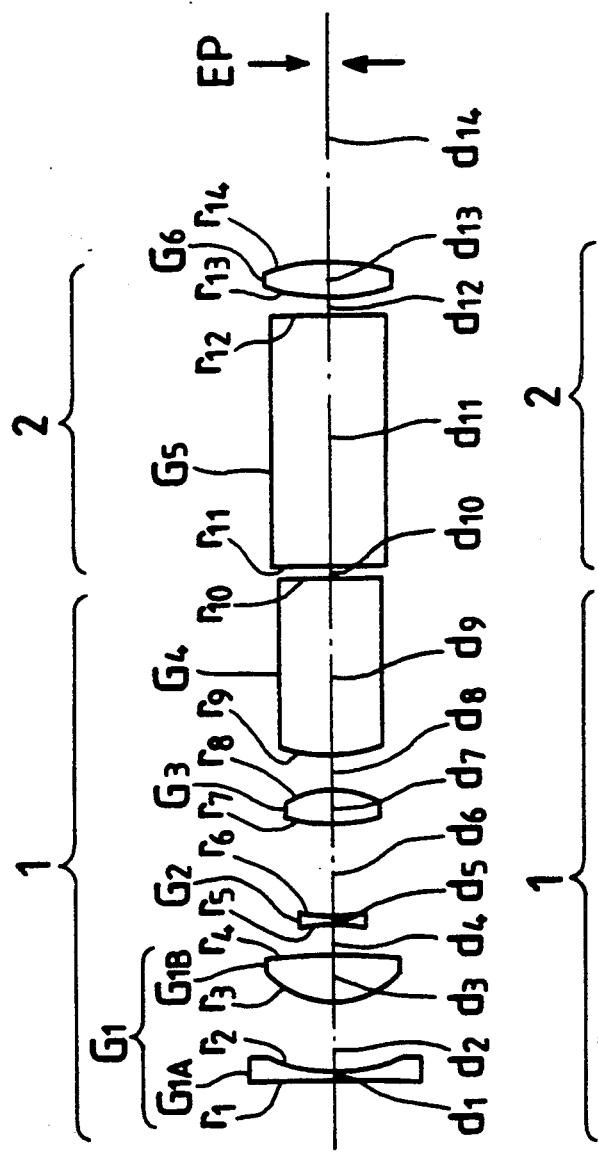
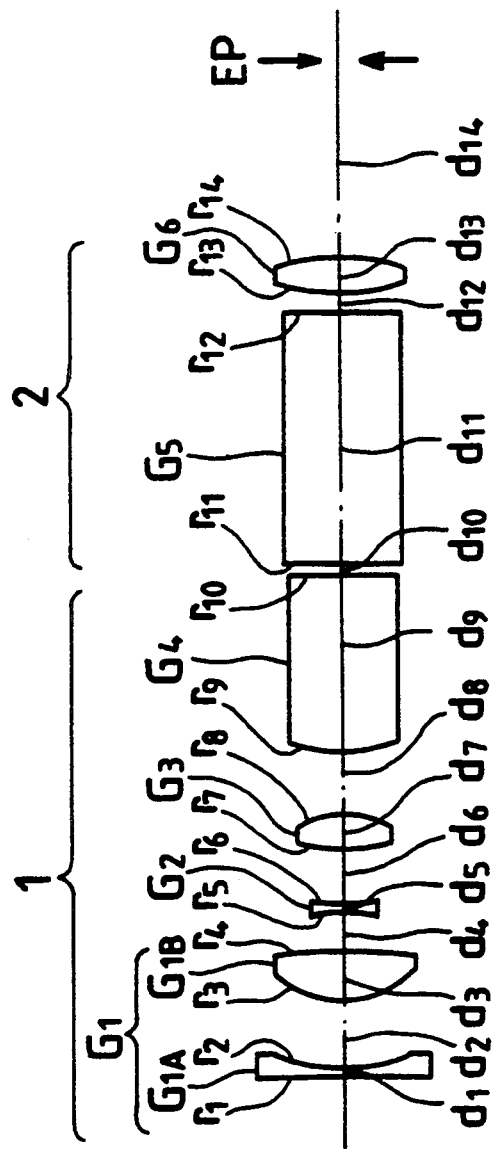
FIG. 22A
FIG. 22B

PUPIL DIA.=2.0mm

ω=23.11°

ω=23.11°

PUPIL DIA.=2.0mm

ω=17.07°

ω=17.07°

REAL IMAGE TYPE VARIABLE MAGNIFICATION VIEW-FINDER OPTICAL SYSTEM

BACKGROUND OF THE INVENTION a) Field of the invention

The present invention relates to a view-finder optical system to be used with photographic cameras, video cameras and so on, and more specifically to a real image type variable magnification view-finder optical system which is suited for panoramic photographing.

b) Description of the prior art

In the recent days, people are fond of photographs taken on films having slenderness ratios which are obtained by trimming the conventional film sizes (for example, 36 mm by 22 mm). As an example of these photographs taken on the films having such slenderness ratios, there is known a panoramic photograph which is obtainable by photographing an object while covering an upper portion and a lower portion of a film and enlarging a photographed image of the object at a printing stage thereof so as to elongate a photographed range of the object sideways for emphasizing a wide impression of the photographed image.

Since a field angle of incidence for trimming a film surface is smaller than a field angle of incidence for photographing an object on a full size of the film surface, it was conventionally necessary to narrow a picture plane of a view-finder of a camera having a panoramic photographing function in conjunction with narrowing of the field angle of incidence so as to maintain a constant field ratio for the panoramic photographing mode. Accordingly, a range of the visual field within which an object is to be photographed was indicated by using straight lines traced within a frame of the visual field or the picture plane of the view-finder was narrowed by shortening a vertical size of the frame of the visual field.

When the range of the visual field within which the object is to be photographed was indicated within the frame of the visual field, however, a photographer could not judge, so long as he was peeping through the view-finder, whether the camera is set in either of the photographing mode and sometimes misunderstood a range within which the object is to be photographed since the picture plane of the view-finder has a size remaining unchanged between a usual photographing mode and the panoramic photographing mode. In this case, the view-finder optical system has another defect that it permitted the photographer observing portions of the visual field which were not to be photographed, thereby hindering the trimming operation to be performed by the photographer. In the other case where the picture plane of the view-finder is narrowed by shortening the vertical size of the frame of the visual field, in contrast, an image observed through the view-finder in the panoramic photographing mode gave a contracted impression, contrary to the wide impression, whereby a photographed image often gave an impression which was often different from that of the image observed at a photographing stage.

In order to correct the defects described above, there have hitherto been contrived methods to enlarge sizes of picture planes of visual fields by enhancing magnifications of view-finders in the panoramic photographing mode. These methods make it possible to enlarge the picture planes in conjunction with field angles of incidence of photographic lens systems so that images observed through the view-finders gave wide impressions.

As one of the methods for enhancing the magnifications of the view-finders, there is known a method to preliminarily design zooming cams so as to permit obtaining vari-focal ratios which are higher than those required for the usual photographing mode and perform, at photographing stages, changes of magnifications for the panoramic photographing mode after shifting vari-focal lens units.

This method requires using two mechanisms for each view-finder: one mechanism required for shifting a vari-focal lens unit regardless of the photographing modes; and the other mechanism required for shifting lens units only in the panoramic photographing mode. As a result, the vari-focal lens unit must be shifted along a complicated locus and an assembly of these two mechanisms has a complicated structure, thereby posing a problem that the mechanisms can hardly be manufactured in practice.

SUMMARY OF THE INVENTION

A primary object of the present invention, which has been made in view of the problems posed by the prior art, is to provide a real image type variable magnification view-finder optical system which has a simple composition and permits performing changes of magnifications without preliminarily shifting lens units in the panoramic photographing mode.

According to the present invention, this object is attained by composing a real image type variable magnification view-finder optical system of an objective lens system which comprises a plurality of lens units and has a positive refractive power as a whole, and an eyepiece lens system for allowing observation of an image formed by the objective lens system; and configuring the view-finder optical system so that a magnification of the view-finder optical system is changed from a wide position to a telephoto position thereof by varying at least one of airspaces reserved among the plurality of lens units, at least one of the lens units comprises two or more lens components and a change of a magnification of the view-finder optical system for trimming of a visual field thereof is performed by varying an airspace reserved between the two lens components or at least one of airspaces reserved among the more lens components.

Now, a preferable formation of the real image type variable magnification view-finder optical system will be explained below.

First, description will be made of changes of magnifications of the view-finder optical system over an entire zooming range, or a method for varying a focal length of the objective lens system by changing a focal length of a lens unit which is to be kept stationary in a photographing mode (hereinafter referred to as a fixed lens unit in some cases) without shifting movable lens units.

FIG. 1 is a diagram descriptive of a fundamental concept of the real image type variable magnification view-finder optical system according to the present invention. In this drawing, the reference numeral 1 represents an objective lens system which consists of a first fixed lens unit $G_1$ (to be kept stationary in a photographing mode), a second movable lens unit $G_2$, a third movable lens unit $G_3$ and a fourth lens unit $G_4$ composed of a prism which functions to form an intermediate image of an object on a surface of emergence thereof after reflecting incident rays twice. The reference numeral 2 designates an eyepiece lens system which consists of a fifth lens unit $G_5$ composed of a prism functioning to reflect the incident rays twice and a sixth fixed lens unit $G_6$, and the reference symbol EP denotes an eye point.

In this preferable formation of the view-finder optical system according to the present invention which has the composition described above, a magnification of the view-finder optical system is changed by varying a focal length of the first fixed lens unit $G_1$. An operating principle for changing the focal length of the first lens unit G, will be described with reference to FIG. 2A illustrating a condition of the objective lens system 1 before changing the focal length of the first lens unit $G_1$ and FIG. 2B illustrating another condition of the objective lens system 1 after changing the focal length of the first lens unit $G_1$. Since the first lens unit $G_1$ is kept stationary over the entire vari-focal range, a focal point $P_A$ thereof is always constant. Accordingly, an object point for the second lens unit $G_2$, the third lens unit $G_3$ and the fourth lens unit $G_4$ is always located at $P_A$, and the object point is imaged at an image point $Q_A$. It is therefore possible to change a focal length of the objective lens system 1 from $F_A$ to $F_A'$ A by changing an airspace $d_{m1}$ reserved between the first lens unit $G_1$ and the second lens unit $G_2$ shown in FIG. 2A to an airspace $d_{m1}'$ shown in FIG. 2B, and changing a focal length of the first lens unit $G_1$ to that of a lens unit $G_1'$ so as to coincide a focal point thereof with $P_A$ while keeping the second lens unit $G_2$, the third lens unit $G_3$ and the fourth lens unit stationary. The magnification of the view-finder optical system can be varied by changing the focal length of the first lens unit $G_1$.

Then, description will be made, with reference to FIG. 3 and FIG. 4, of an operating principle of the magnification of the view-finder optical system in a case where the first lens unit $G_1$ is movable. In FIG. 3, the reference numeral 1 represents an objective lens system which consists of a first movable lens unit $G_7$, a second movable lens unit $G_8$ and a third movable lens unit $G_9$ which is composed of a prism functioning to form an intermediate image on a surface of emergence thereof after reflecting incident rays twice. The reference numeral 2 designates an eyepiece lens system which consists of a fourth lens unit $G_{10}$ composed of a prism functioning to reflect the incident rays twice and a fifth fixed lens unit $G_{11}$, whereas the reference symbol EP denotes an eye point.

In case of the view-finder optical system which has the composition described above, a magnification thereof is varied by changing a focal length of the first movable lens unit $G_7$. An operating principle for changing the focal length of the first lens unit $G_7$ will be described with reference to FIG. 4A illustrating a condition of the objective lens system before changing the focal length of the first lens unit $G_7$ and FIG. 4B illustrating another condition of the objective lens system after changing the focal length of the first lens unit $G_7$. Let us represent a focal point of the first lens unit $G_7$ in a given vari-focal position by $P_B$. At this position, an object point $P_B$ for the second lens unit $G_8$ and the third lens unit $G_9$ is imaged at an image point $Q_B$. When an airspace $d_{m7}$ reserved between the first lens unit $G_7$ and the second lens unit $G_8$ shown in FIG. 4A is varied to an airspace $d_{m7}'$ shown in FIG. 4B and a focal length of the first lens unit $G_7$ is changed to that of a lens unit $G_7'$ so as to coincide a focal point thereof with $P_B$, a focal length of the objective lens system 1 can be varied from $F_B$ to $F_B'$ while keeping a constant airspace $d_{m8}$ reserved between the second lens unit $G_8$ and the third lens unit $G_9$. Since the first lens unit $G_7$ is movable, however, the airspace $d_{m7}$ is not constant as is understood from ($d_{m7} \neq d_{m7}'$). A magnification of the view-finder optical system can be changed by varying the focal length of the first movable lens unit $G_7$ as well as the airspace reserved between the first lens unit $G_7$ and the second lens unit $G_8$.

Description has been made above of the fact that the magnification of the view-finder optical system can be changed by varying a focal length of a certain lens unit. Now, a method to vary the focal length of this lens unit will be explained. It is conceivable, as a simplest method to vary a focal length, to exchange a lens unit with another. However, it is necessary for carrying out this method to reserve a space for saving the lens unit from an optical path, whereby a camera which is to use a view-finder optical system comprising this lens unit will sometimes be enlarged and complicated in mechanical structure thereof. In the view-finder optical system according to the present invention, such a lens unit is composed of two or more lens components and a focal length of the lens unit is varied by moving these lens components along an optical axis.

For varying the focal length of the lens unit without exchanging the lens unit with another, it is sufficient to compose the lens unit of two or more lens components and vary a total focal length of the lens components by moving at least two of the lens components. An operating principle for varying the focal length of the lens unit will be described with reference to FIG. 5A and FIG. 5B. A lens unit shown in these drawings corresponds to the first lens unit $G_1$ or $G_7$ which has been described above. When a focal length of a front lens component $G_{1A}$ Of the lens unit is represented by $f_1$, a focal length of a rear lens component $G_{1B}$ is designated by $f_2$, an airspace reserved between these lens components is denoted by d and a total focal length of these two lens components is represented by f (see FIG. 5A), we obtain the following formula (1):

$$1/f = 1/f_1 + 1/f_2 - d/f_1 f_2, \text{ or } f = f_1 f_2/(f_1 + f_2 - d) \tag{1}$$

When a focal length of the view-finder optical system after changing the magnification thereof is represented by f' and an airspace reserved between the lens components after changing the magnification is designated by d' (see FIG. 5B), f' is defined as Mf (M: a constant), d' is expressed by the following formula (2):

$$d' = [(M-1)/M] \cdot (f_1 + f_2) + d/M \tag{2}$$

In the formula (2) mentioned above, the term [(M−1)/M] is a constant and the term (d/M) is also a constant when d is assumed to be, for example, as 1 mm. Hence, d' is a function of the term ($f_1 + f_2$).

When $f_1$ and $f_2$ have the same sign in the formulae (1) and (2) mentioned above, i.e., in a case of ($f_1 > 0$, $f_2 > 0$) or ($f_1 < 0$, $f_2 < 0$), the airspace d is largely different from the airspace d', thereby making the view-finder optical system unpractical. When $f_1$ has a sign which is reverse to that of $f_2$, it is possible to change the total focal length by slightly varying the airspace d, thereby obtaining an advantage for configuring the view-finder optical system compact. Accordingly, it is desirable to configure the front lens component and the rear lens component so that $f_1$ and $f_2$ have signs which are reverse to each other, i.e., so as to have relationship of ($f_1>0$, $f_2<0$) or ($f_1<0$, $f_2>0$).

When the vari-focal lens unit is composed of two or more lens components, it is possible to change the magnification of the view-finder optical system over the entire zooming range simply by varying an airspace reserved between the two or more lens components. For moving these two or more lens components for short distances and shortening a total length of the objective lens system, it is sufficient to configure the vari-focal lens unit so as to satisfy the following conditions (3) and (4):

$$(f_1+d')/(f_1+d) > 1.02 \qquad (3)$$

$$(f_2+d')/(f_2+d) > 1.02 \qquad (4)$$

wherein the reference symbol $f_1$ represents a focal length of the front lens component $G_{1A}$ of the vari-focal lens unit, the reference symbol $f_2$ designates a focal length of the rear lens component $G_{1B}$ of the vari-focal lens unit, the reference symbol d denotes an airspace reserved between these two lens components at a low magnification of the view-finder optical system and the reference symbol d' represents an airspace reserved between the lens components at a high magnification of the view-finder optical system.

Let us represent a total focal length of these lens components by f. The condition (3) is to be adopted in a case of $f>0$ and ($f_1<0$, $f_2>0$) or a case of $f<0$($f_1>0$, $f_2<0$). The condition (4) is to be adopted in a case of $f>0$ and ($f_1>0$, $f_2<0$) or a case of $f<0$ ($f_1<0$, $f_2>0$).

In each of the cases mentioned above, aberrations will be aggravated due to $f_2$ if the condition (3) is not satisfied or aberrations will be aggravated due to $f_1$ if the condition (4) is not satisfied. Optical performance of the view-finder optical system will be remarkably degraded by the aggravation of the aberrations.

It is desirable that the lens components which are movable toward the side of the eyepiece lens system in the lens unit comprising the variable airspace have a total focal length whose sign is reverse to that of a focal length of the lens unit comprising the variable airspace since the lens components will be large and aberrations cannot be corrected favorably if these focal lengths have signs which are not reverse to each other. Furthermore, use of at least one aspherical surface in each of the lens units is advantageous for correcting aberrations favorably to certain degrees and shortening of a total length of the objective lens system.

When the objective lens system consists of three lens units including a first fixed lens unit and a magnification of the objective lens system is to be changed by moving lens components disposed in the first lens unit, the objective lens unit should desirably satisfy the following condition (5):

$$m_{2T}/m_{2W} - m_{3T}/m_{3W} > 0 \qquad (5)$$

wherein the reference symbol $m_{2W}$ represents a magnification of a second lens unit at the wide position of the view-finder optical system, the reference symbol $m_{2T}$ designates a magnification of the second lens unit at the telephoto position of the view-finder optical system, the reference symbol $m_{3W}$ denotes a magnification of a third lens unit at the wide position of the view-finder optical system and the reference symbol $m_{3T}$ represents a magnification of the third lens unit at the telephoto position of the view-finder optical system.

As is judged from the condition (5) mentioned above, the second lens unit has a main role for changing the magnification, whereas the third lens unit has a role to adjust diopter. If the condition (5) is not satisfied, it will be impossible to reserve required airspaces among the lens units or compose the objective lens system in practice.

Moreover, it is possible to compose the view-finder optical system so as to permit graduating magnification scale divisions for zooming operations at equal intervals or at intervals which are different at different magnification levels. For this purpose, it is necessary to use two kind of cams.

The present invention makes it possible to change a magnification of the view-finder optical system so as to be suited for the panoramic photographing mode by varying an airspace reserved between the lens components of the lens unit consisting of the two or more lens units. When the lens unit is kept stationary so long as a photographing mode is not switched to the other, it is possible to select a constant airspace among the other movable lens units or a constant shape for the cams. As a result, the real image type variable magnification view-finder optical system according to the present invention has a merit that it can be simple in a mechanical structure thereof.

This and other objects as well as the features and the advantages of the present invention will become apparent from the following detailed description of the preferred embodiments when taken in conjunction with the accompanying drawings.

BRIEF DESCRIPTION OF THE DRAWINGS

FIG. 1 is a diagram descriptive of the concept of the real image type variable magnification view-finder optical system according to the present invention when it is configured so as to vary a focal length of a fixed lens unit;

FIG. 2A and FIG. 2B are diagrams illustrating an operating principle of the real image type variable magnification view-finder optical system when it is configured so as to vary a focal length of a fixed lens unit, or conditions of the real image type variable magnification view-finder optical system before and after respectively the focal length of the fixed lens unit is varied;

FIG. 3 is a diagram descriptive of a concept of the real image type variable magnification view-finder optical system according to the present invention when it is configured so as to vary a focal length of a movable lens unit;

FIG. 11 shows development diagrams of optical paths at the wide position, middle position and telephoto position of the second embodiment of the present invention in the panoramic photographing mode thereof;

DESCRIPTION OF THE PREFERRED EMBODIMENTS

Now, the real image type variable magnification view-finder optical system according to the present invention will be described more detailedly below with reference to the preferred embodiments thereof illustrated in the accompanying drawings.

First Embodiment

Figure 4A:
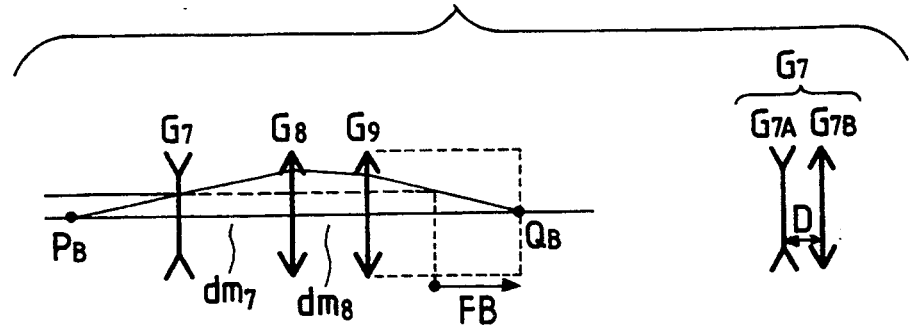
FIG. 4A and FIG. 4B are diagrams illustrating an operating principle of the real image type variable magnification view-finder optical system according to the present invention when it is configured so as to vary the focal length of the movable lens unit, or conditions of the real image type variable magnification view-finder optical system before and after respectively the focal length of the movable lens unit is varied.
Figure 4B:
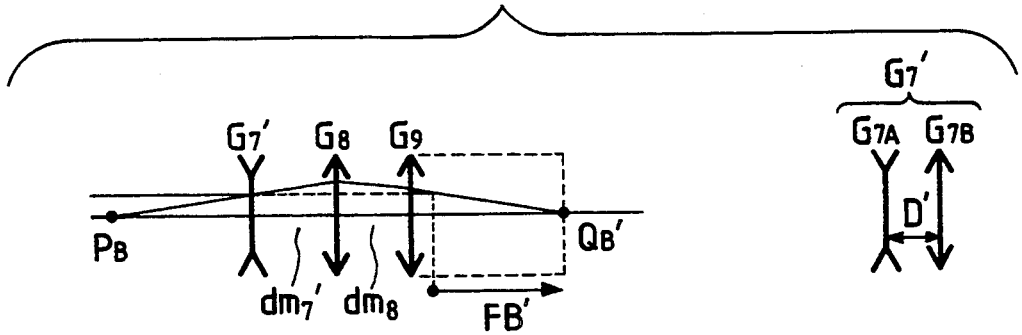
Figure 5A:
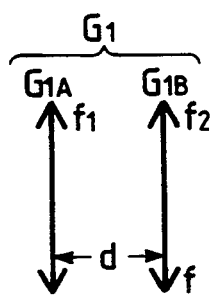
FIG. 5A and FIG. 5B are diagrams visualizing an operating principle of an optical system when it is configured so as to vary a focal length thereof by varying airspaces reserved among lens units, or conditions of the optical system before and after respectively the airspaces among the lens units are varied.
Figure 5B:
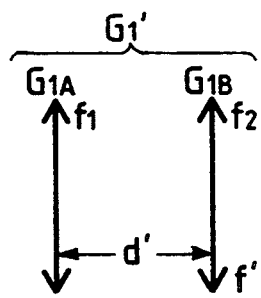
Figures 6A, 6B:
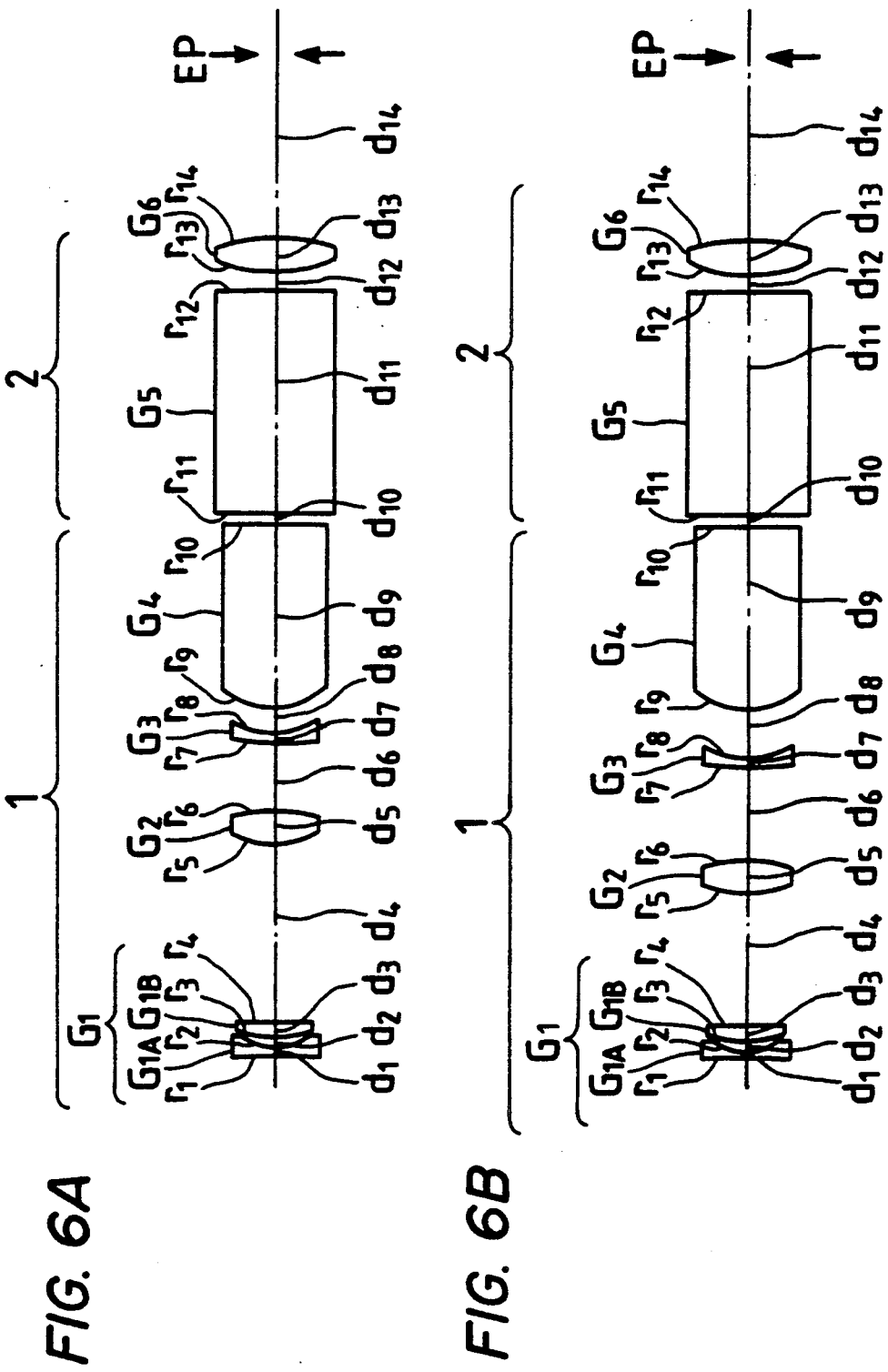
FIG. 6 shows development diagrams of optical paths at a wide position, a middle position and a telephoto position of a first embodiment of the real image type variable magnification view-finder optical system according to the present invention when it is set in the usual photographing mode.
Figure 6C:
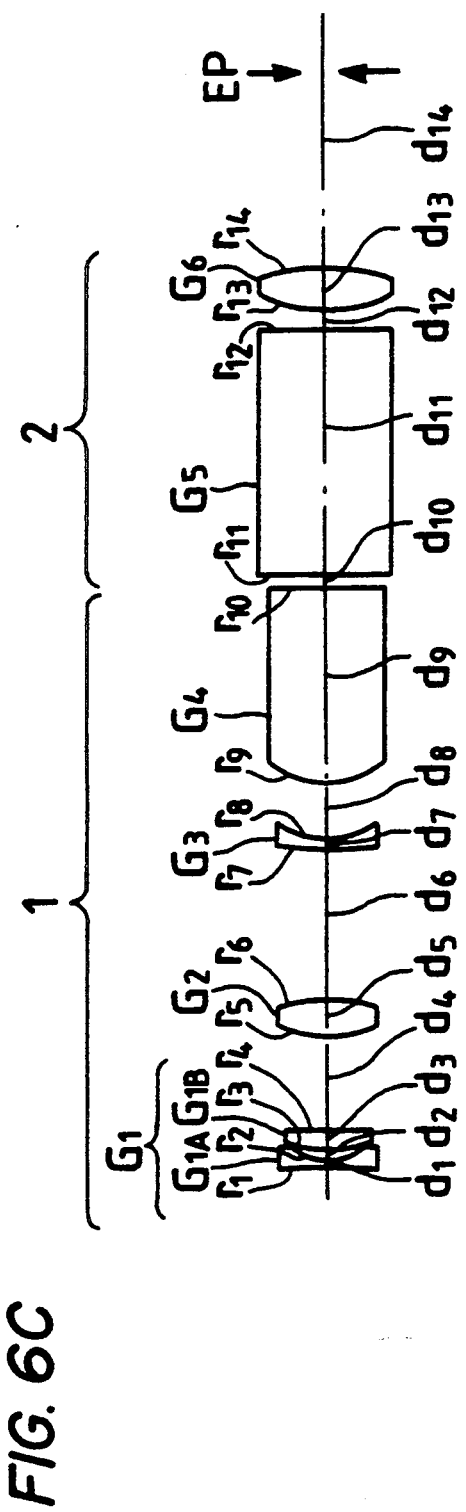
Figure 7C:
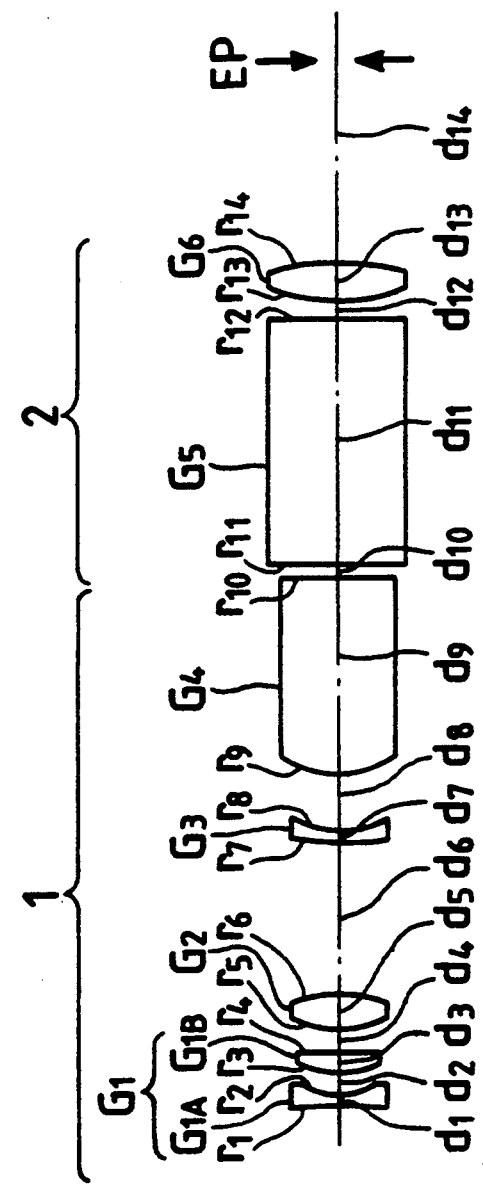
FIG. 7 shows development diagrams of optical paths at the wide position, middle position and telephoto position of the first embodiment of the present invention when it is set in the panoramic photographing mode.
Figure 8A:
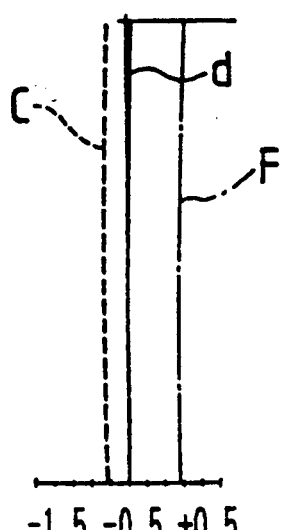
FIG. 8 shows graphs illustrating aberration characteristics of the first embodiment of the present invention in the usual photographing mode thereof.
Figure 8B:
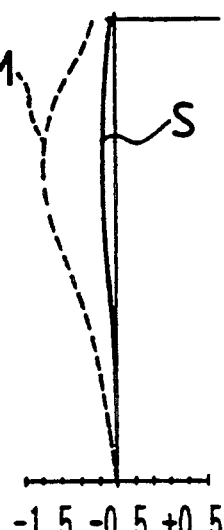
Figure 8C:
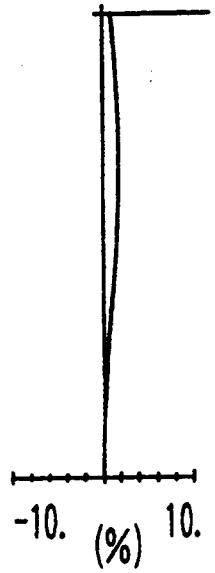
Figure 8D:
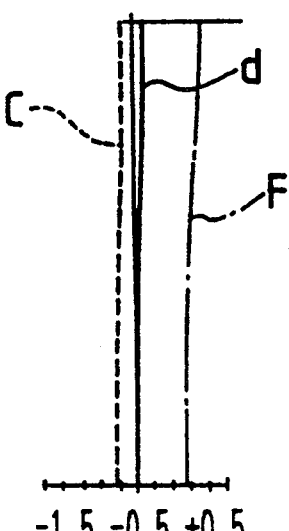
Figure 8E:
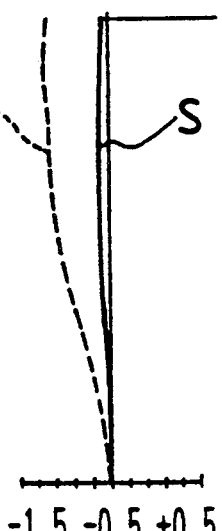
Figure 8F:
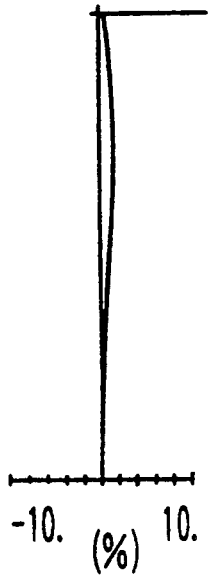
Figure 8G:
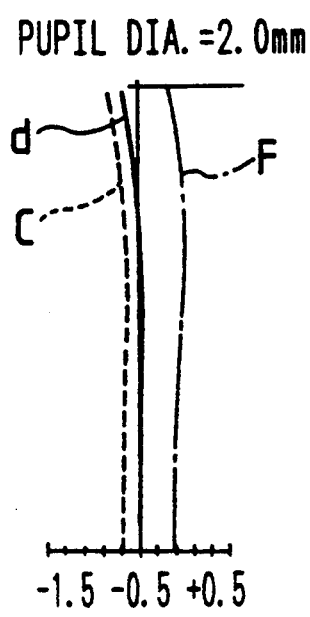
Figure 8H:
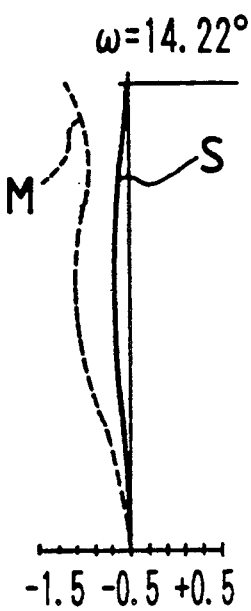
Figure 8I:
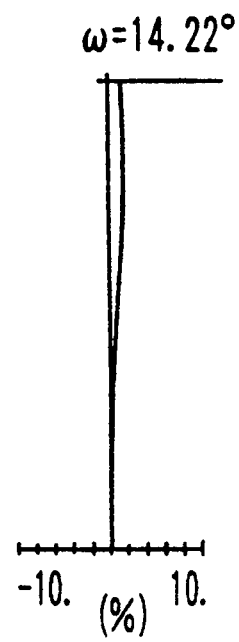
Figure 9A:
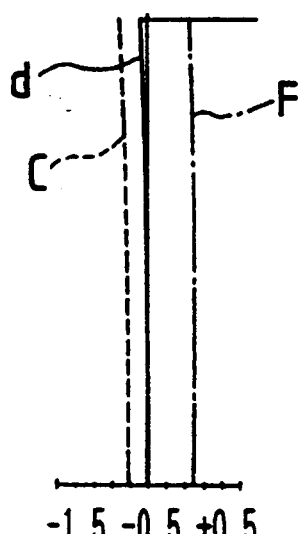
FIG. 9 shows graphs illustrating aberration characteristics of the first embodiment of the present invention in the panoramic photographing mode thereof.
Figure 9B:
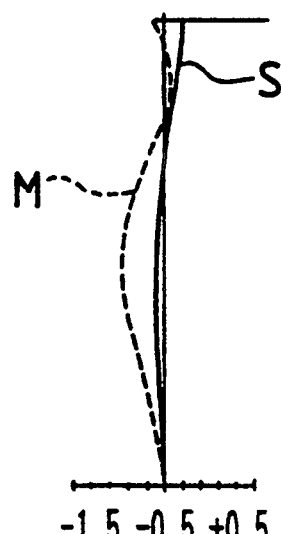
Figure 9C:
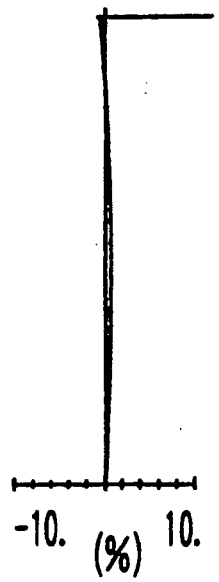
Figure 9D:
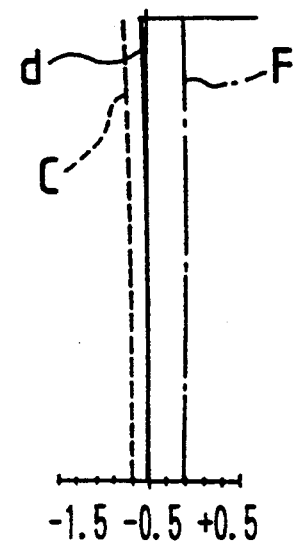
Figure 9E:
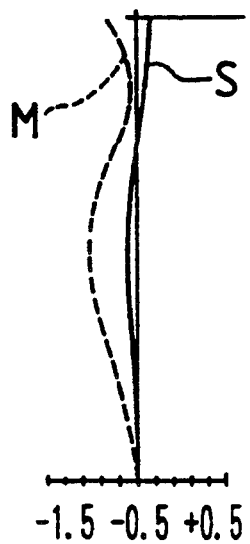
Figure 9F:
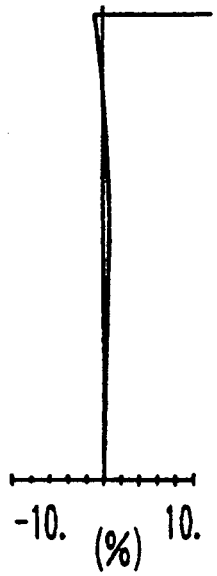
Figure 9G:
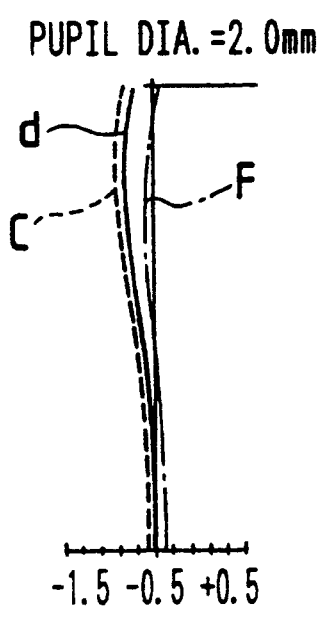
Figure 9H:
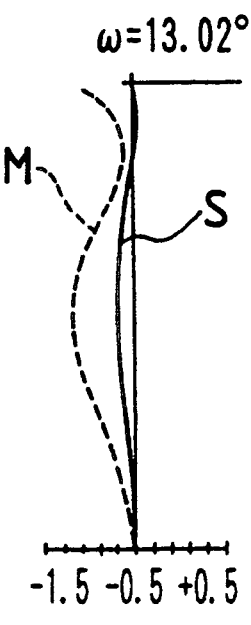
Figure 9I:
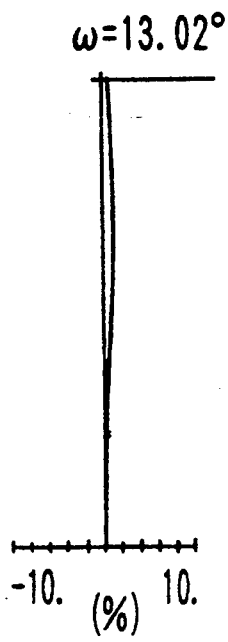

FIG. 6 and FIG. 7 illustrate the development diagrams of optical paths at the wide position, middle position and telephoto position of the first embodiment of the real image type variable magnification view-finder optical system according to the present invention in the usual photographing mode and the panoramic photographing mode respectively. An objective lens system 1 shown in these drawings consists of a first fixed lens unit $G_1$ which has a negative refractive power as a whole, and is composed of a first lens component $G_{1A}$ having a negative refractive power and a second lens component $G_{1B}$ having a positive refractive power, a second movable lens unit $G_2$ which has a positive refractive power and is movable for zooming, a third lens unit $G_3$ which has a negative refractive power and is movable for zooming, and a fourth lens unit $G_4$ composed of a prism which has two reflecting surfaces and a positive refractive power. An intermediate image of an object (not shown) is formed by the objective lens system within a visual field frame which is disposed on a surface of emergence of the fourth lens unit $G_4$. This intermediate image is observed through an eyepiece lens system 2 which consists of a fifth lens unit $G_5$ composed of a prism having two reflecting surfaces and a sixth fixed lens unit $G_6$ having a positive refractive power.

In the usual photographing mode, a magnification of the view-finder optical system is changed by moving the second lens unit $G_2$ and the third lens unit $G_3$ while keeping the first lens unit $G_1$ stationary. In the panoramic photographing mode, in contrast, a magnification of the view-finder optical system can be changed by varying an airspace reserved between the first lens component $G_{1A}$ and the second lens component $G_{1B}$ of the first lens unit $G_1$ and moving the first lens unit $G_1$ so as to vary an airspace reserved between this lens unit and the second lens unit $G_2$ for adjustment of diopter while keeping the second lens unit $G_2$, the third lens unit $G_3$ and the fourth lens unit $G_4$ stationary. In conjunction with switching from the usual photographing mode to the panoramic photographing mode, a visual field frame for the usual photographing mode (not shown) is exchanged with another for the panoramic photographing mode. In addition, the magnification of the view-finder optical system is changed also by moving the second lens unit $G_2$ and the third lens unit $G_3$.

The first embodiment of the present invention features a merit of simple mechanical structure thereof owing to the fact that the magnification of the view-finder optical system can be changed to a desired level simply by moving tile first lens unit $G_1$ (which is to be kept stationary in either of the two photographing modes) and varying the airspace reserved in this lens unit without changing locations of the movable lens units.

Numerical data for the development diagrams of the optical paths shown in FIG. 6 and FIG. 7 are listed below. Further, aberration characteristics at the wide position, middle position and telephoto position in the usual photographing mode are illustrated in FIG. 8, and those at the wide position, middle position and telephoto position in the panoramic photographing mode of the first embodiment are illustrated in FIG. 9.

<Usual photographing mode>
Magnification  0.42~0.55~0.73
Angle of incidence ($2\omega$)  49.8°~38.9°~28.4°
<Panoramic photographing mode>
Magnification  0.50~0.66~0.88
Angle of incidence ($2\omega$)  46.2°~35.9°~26.0°
Condition (4)  $(f_2 + d')/(f_2 + d) = 1.083$
Condition (5)  $m_{2T}/m_{2W} - m_{3T}/m_{3W} = 0.775$ $r_1 = -134.7637$    $d_1 = 1.000$    $n_1 = 1.58423$    $\nu_1 = 30.49$
$r_2 = 4.8230$ (aspherical surface)    $d_2 = D_1$ (variable)
$r_3 = 9.0460$ (aspherical surface)    $d_3 = 2.000$    $n_2 = 1.49241$    $\nu_2 = 57.66$
$r_4 = 359.1474$    $d_4 = D_2$ (variable)
$r_5 = 11.7341$    $d_5 = 3.500$    $n_3 = 1.49241$    $\nu_3 = 57.66$
$r_6 = -19.3895$ (aspherical surface)    $d_6 = D_3$ (variable)
$r_7 = 41.3019$    $d_7 = 1.000$    $n_4 = 1.58423$    $\nu_4 = 30.49$
$r_8 = 8.3103$    $d_8 = D_4$ (variable)
$r_9 = 7.6460$ (aspherical surface)    $d_9 = 20.445$    $n_5 = 1.49241$    $\nu_5 = 57.66$
$r_{10} = \infty$    $d_{10} = 1.000$
$r_{11} = \infty$    $d_{11} = 25.000$    $n_6 = 1.49241$    $\nu_6 = 57.66$
$r_{12} = \infty$    $d_{12} = 2.000$
$r_{13} = 17.8899$    $d_{13} = 3.400$    $n_7 = 1.49241$    $\nu_7 = 57.66$
$r_{14} = -22.9622$ (aspherical surface)    $d_{14} = 20.000$
$r_{15}$ (EP)

Aspherical surface coefficients
Second surface ($r_2$)
$P = 1.0000$    $A_4 = -0.17361 \times 10^{-2}$
$A_6 = 0.22728 \times 10^{-4}$    $A_8 = -0.26239 \times 10^{-5}$
Third surface ($r_3$)
$P = 1.0000$    $A_4 = -0.49459 \times 10^{-3}$
$A_6 = 0.12656 \times 10^{-4}$    $A_8 = -0.11763 \times 10^{-6}$
Sixth Surface ($r_6$)
$P = 1.0000$    $A_4 = 0.12237 \times 10^{-3}$
$A_6 = 0.14520 \times 10^{-5}$    $A_8 = 0.10884 \times 10^{-8}$
Ninth surface ($r_9$)
$P = 1.0000$    $A_4 = -0.36463 \times 10^{-3}$
$A_6 = 0.30412 \times 10^{-5}$    $A_8 = -0.12085 \times 10^{-6}$
Fourteenth surface ($r_{14}$)
$P = 1.0000$    $A_4 = 0.79267 \times 10^{-4}$
$A_6 = -0.57040 \times 10^{-6}$    $A_8 = 0.68501 \times 10^{-8}$
Airspaces at different positions

TABLE 1

| | <Usual photographing mode> | | |
|---|---|---|---|
| | Wide angle position | Middle position | Telephoto position |
| $D_1$ | 1.0000 | 1.0000 | 1.0000 |

TABLE 1-continued

| | <Usual photographing mode> | | |
|---|---|---|---|
| | Wide angle position | Middle position | Telephoto position |
| $D_2$ | 19.8269 | 14.3983 | 9.3809 |
| $D_3$ | 7.5305 | 10.4829 | 15.4403 |
| $D_4$ | 2.8556 | 5.3318 | 5.3917 |

TABLE 2

| | <Panoramic photographing mode> | | |
|---|---|---|---|
| | Wide angle position | Middle position | Telephoto position |
| $D_1$ | 2.6456 | 2.6456 | 2.6456 |
| $D_2$ | 12.6934 | 7.2648 | 2.2475 |
| $D_3$ | 7.5305 | 10.4829 | 15.4403 |
| $D_4$ | 2.8555 | 5.3318 | 5.3917 |

Second Embodiment

Figure 10A:
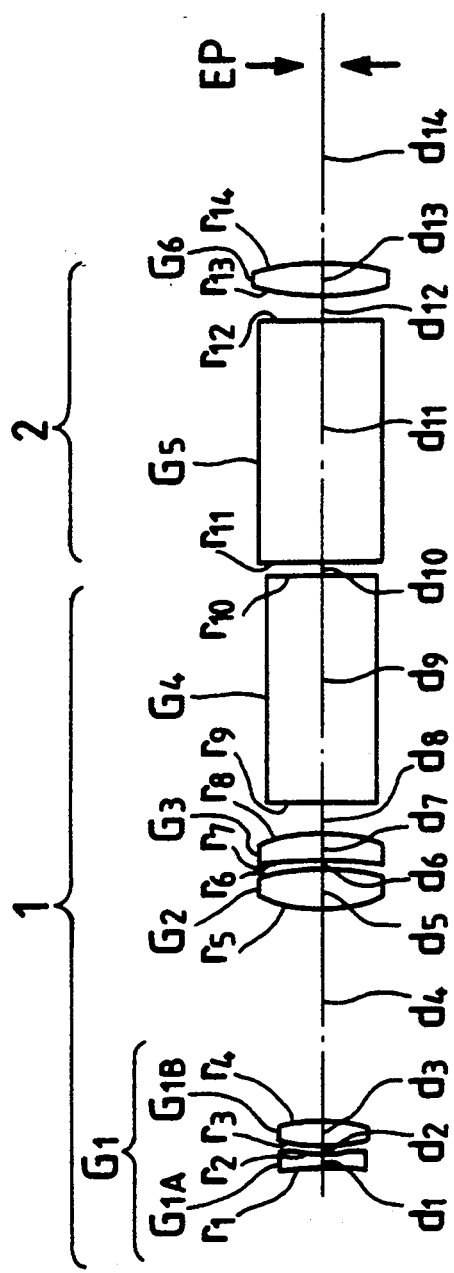
FIG. 10 shows graphs development diagrams of optical paths at the wide position, middle position and telephoto position of a second embodiment of the real image type variable magnification view-finder optical system according to the present invention when it is set in the usual photographing mode.
Figure 10B:
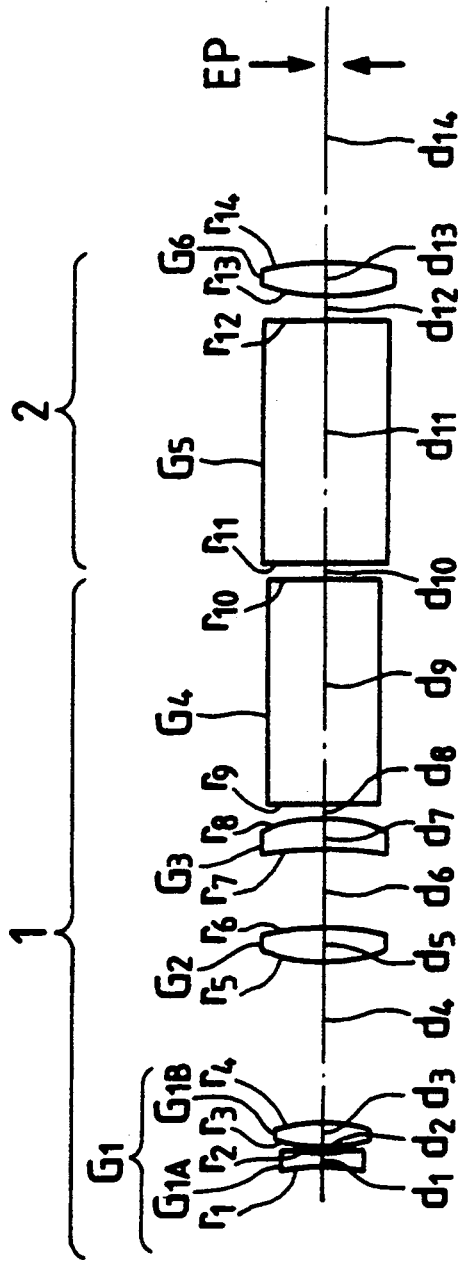
Figure 10C:
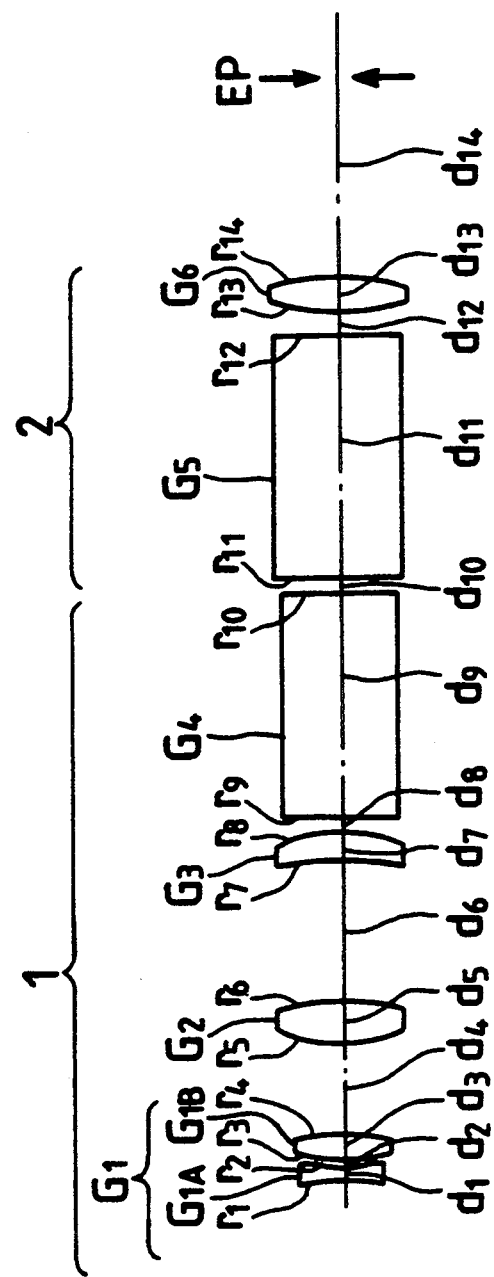
Figure 12A:
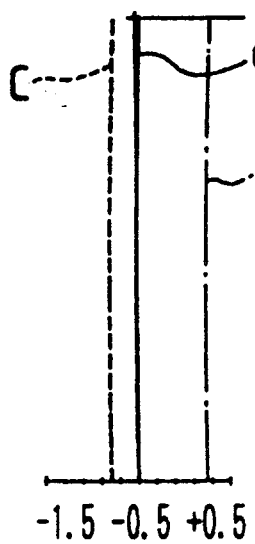
FIG. 12 shows curves illustrating aberration characteristics of the second embodiment of the present invention in the usual photographing mode thereof.
Figure 12B:
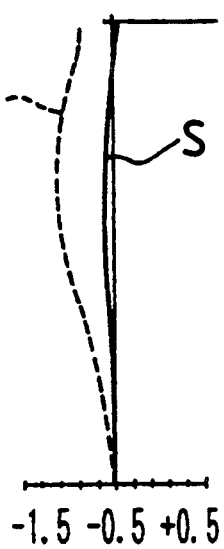
Figure 12C:
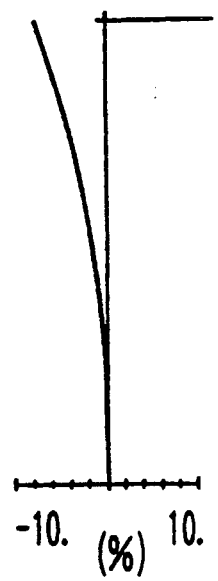
Figure 12D:
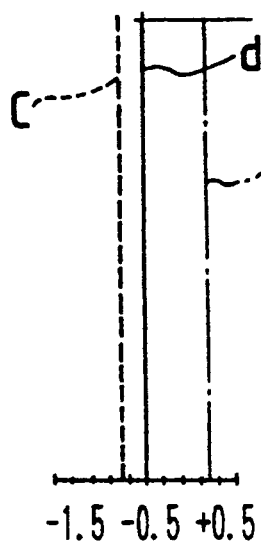
Figure 12E:
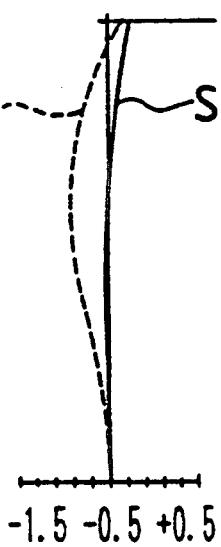
Figure 12F:
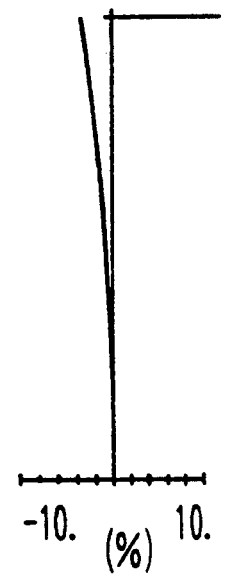
Figure 12G:
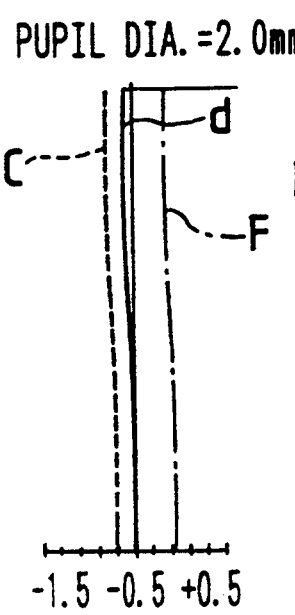
Figure 12H:
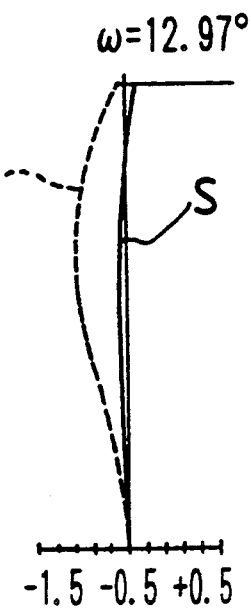
Figure 12I:
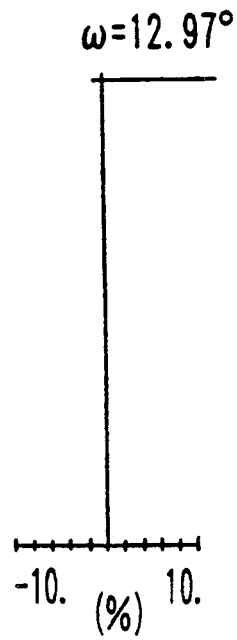

FIG. 10 and FIG. 11 show development diagrams of optical paths at the wide position, middle position and telephoto position of the real image type variable magnification view-finder optical system preferred as the second embodiment of the present invention; FIG. 10 illustrating the optical paths in the usual photographing mode and FIG. 11 illustrating the optical paths in the panoramic photographing mode. The view-finder optical system preferred as this embodiment consists of an objective lens system 1 and an eyepiece lens system 2. The objective lens system 1 consists of a first fixed lens unit $G_1$ which is composed of a first lens component $G_{1A}$ having a negative refractive power and a second lens component $G_{1B}$ having a positive refractive power, and has a negative refractive power as a whole, a second movable lens unit $G_2$ which has a positive refractive power and is movable for zooming, a third movable lens unit $G_3$ having a positive refractive power, and a fourth lens unit $G_4$ composed of a prism which has two reflecting surfaces and a positive refractive power, whereas the eyepiece lens system 2 consists of a fifth lens unit $G_5$ composed of a prism which has two reflecting surfaces and a sixth fixed lens unit $G_6$ having a positive refractive power. Though not shown in FIG. 10 or FIG. 11, visual field frames which have sizes matched with the photographing modes are disposed on a surface of emergence of the fourth lens unit $G_4$.

Even when each of the second lens unit $G_2$ and the third lens unit $G_3$ is composed of a single lens component having a positive refractive power, unlike the first and second lens units used in the first embodiment, the second embodiment can provide the effect which is similar to that obtained by the first embodiment.

Figure 13G:
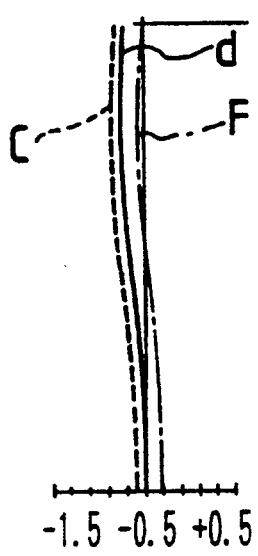
FIG. 13 shows curves illustrating aberration characteristics of the second embodiment of the present invention in the panoramic photographing mode thereof.
Figure 13H:
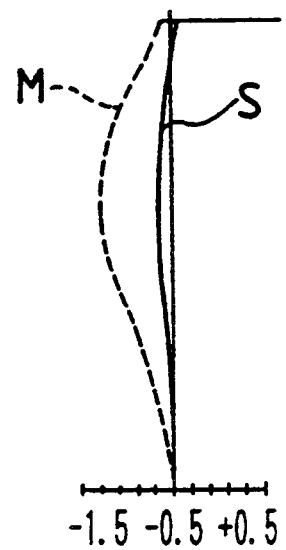
Figure 13I:

Numerical data for the development diagrams shown in FIG. 10 and FIG. 11 are listed below. Further, aberration characteristics at the wide position, middle position and telephoto position in the usual photographing mode are visualized in FIG. 12 and those at the wide position, middle position and telephoto position in the panoramic photographing mode are visualized in FIG. 13.

<Usual photographing mode>
Magnification  0.42~0.55~0.73
Angle of incidence ($2\omega$)  48.7°~36.3°~25.9°
<Panoramic photographing mode>

-continued

| | |
|---|---|
| Magnification | 0.50~0.66~0.83 |
| Angle of incidence (2ω) | 43.8°~32.8°~23.3° |
| Condition (4) | $(f_2 + d')/(f_2 + d) = 1.062$ |
| Condition (5) | $m_{2T}/m_{2W} - m_{3T}/m_{3W} = 0.748$ |

| | | | |
|---|---|---|---|
| $r_1 = -11.5915$ | $d_1 = 1.000$ | $n_1 = 1.58423$ | $v_1 = 30.49$ |
| $r_2 = 8.7806$ (aspherical surface) | $d_2 = D_1$ (variable) | | |
| $r_3 = 16.5152$ (aspherical surface) | $d_3 = 2.000$ | $n_2 = 1.49241$ | $v_2 = 57.66$ |
| $r_4 = -16.6476$ | $d_4 = D_2$ (variable) | | |
| $r_5 = 15.4967$ | $d_5 = 3.500$ | $n_3 = 1.49241$ | $v_3 = 57.66$ |
| $r_6 = -27.6468$ (aspherical surface) | $d_6 = D_3$ (variable) | | |
| $r_7 = -39.8150$ | $d_7 = 3.000$ | $n_4 = 1.49241$ | $v_4 = 57.66$ |
| $r_8 = -14.1016$ (aspherical surface) | $d_8 = D_4$ (variable) | | |
| $r_9 = \infty$ | $d_9 = 23.107$ | $n_5 = 1.49241$ | $v_5 = 57.66$ |
| $r_{10} = \infty$ | $d_{10} = 1.000$ | | |
| $r_{11} = \infty$ | $d_{11} = 25.000$ | $n_6 = 1.49241$ | $v_6 = 57.66$ |
| $r_{12} = \infty$ | $d_{12} = 2.000$ | | |
| $r_{13} = 17.8960$ | $d_{13} = 3.400$ | $n_7 = 1.49241$ | $v_7 = 57.66$ |
| $r_{14} = -22.9520$ (aspherical surface) | $d_{14} = 20.000$ | | |
| $r_{15}$ (EP) | | | |

Aspherical surface coefficients
Second surface ($r_2$)
$P = 1.0000$   $A_4 = -0.71271 \times 10^{-3}$
$A_6 = -0.69719 \times 10^{-5}$   $A_8 = 0.33408 \times 10^{-6}$
Third surface ($r_3$)
$P = 1.0000$   $A_4 = -0.24343 \times 10^{-3}$
$A_6 = 0.32518 \times 10^{-5}$   $A_8 = -0.90260 \times 10^{-7}$
Sixth Surface ($r_6$)
$P = 1.0000$   $A_4 = 0.82557 \times 10^{-4}$
$A_6 = 0.86903 \times 10^{-6}$   $A_8 = -0.22639 \times 10^{-7}$
Eight surface ($r_8$)
$P = 1.0000$   $A_4 = 0.13461 \times 10^{-3}$
$A_6 = -0.18620 \times 10^{-5}$   $A_8 = 0.36551 \times 10^{-7}$
Fourteenth surface ($r_{14}$)
$P = 1.0000$   $A_4 = 0.79267 \times 10^{-4}$
$A_6 = -0.57040 \times 10^{-6}$   $A_8 = 0.68501 \times 10^{-8}$
Airspaces at different portions

TABLE 3

| | <Usual photographing mode> | | |
|---|---|---|---|
| | Wide angle position | Middle position | Telephoto position |
| $D_1$ | 1.0000 | 1.0000 | 1.0000 |
| $D_2$ | 22.2947 | 16.2874 | 9.5672 |
| $D_3$ | 1.0000 | 8.2126 | 14.3385 |
| $D_4$ | 3.2053 | 2.0000 | 2.5943 |

TABLE 4

| | <Panoramic photographing mode> | | |
|---|---|---|---|
| | Wide angle position | Middle position | Telephoto position |
| $D_1$ | 2.1336 | 2.1336 | 2.1336 |
| $D_2$ | 13.7275 | 7.7202 | 1.0000 |
| $D_3$ | 1.0000 | 8.2126 | 14.3385 |
| $D_4$ | 3.2053 | 2.0000 | 2.5943 |

Third Embodiment

Figures 14A, 14B:
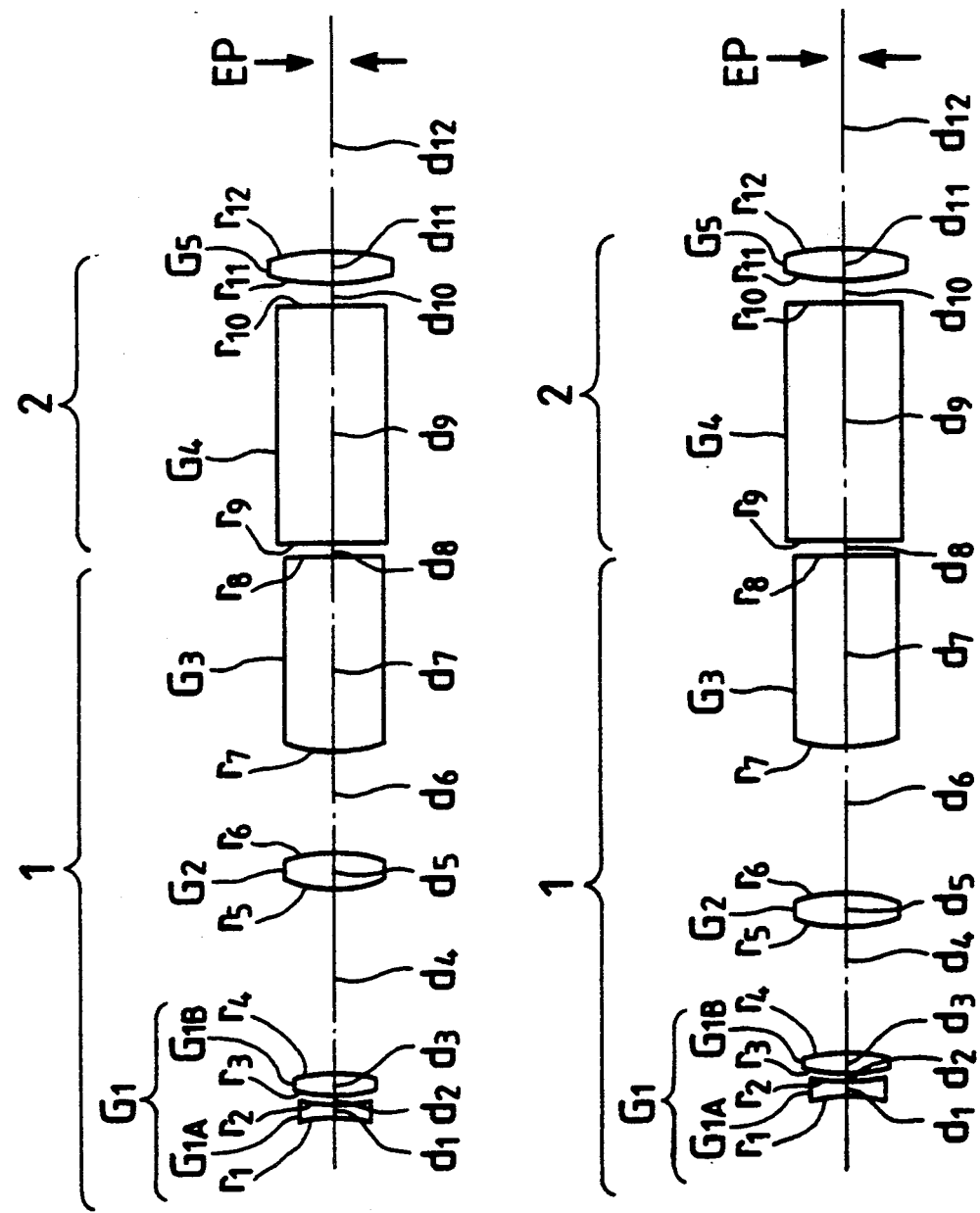
FIG. 14 shows development diagrams of optical paths at the wide position, middle position and telephoto position of a third embodiment of the real image type variable magnification view-finder optical system according to the present invention when it is set in the usual photographing mode.
Figure 14C:
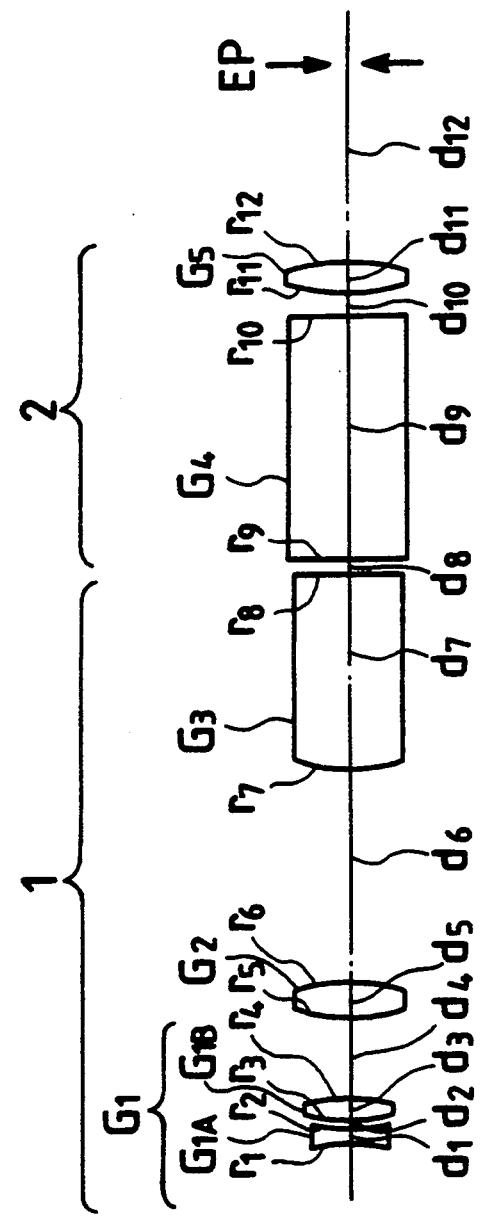
Figure 15C:
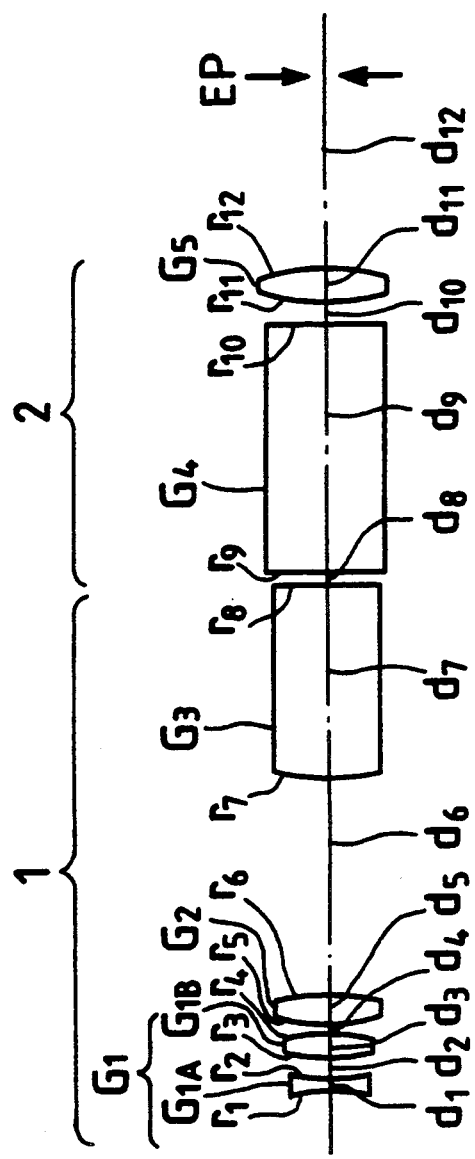
FIG. 15 shows development diagrams of optical paths at the wide position, middle position and telephoto position of the third embodiment of the present invention when it is set in the panoramic photographing mode.

FIG. 14 and FIG. 15 are development diagrams illustrating optical paths at the wide position, middle position and telephoto position of the real image type variable magnification view-finder optical system which is preferred as the third embodiment of the present invention; FIG. 14 showing the optical paths in the usual photographing mode and FIG. 15 showing those in the panoramic photographing mode. The view-finder optical system preferred as this embodiment consists of an objective lens system I and an eyepiece lens system 2.

The objective lens system 1 comprises a first lens unit $G_1$ which consists of a first lens component $G_{1A}$ having a negative refractive power and a second lens component $G_{1B}$ having a positive refractive power, and has a negative refractive power as a whole, the first lens unit $G_1$ being so arranged that the first lens component $G_{1A}$ and the second lens component $G_{1B}$ may be moved integrally for zooming and an airspace therebetween may be varied when the usual photographing mode is changed to the panoramic photographing mode or when the panoramic photographing mode is changed to the usual photographing mode, a second lens unit $G_2$ which has a positive refractive power and is to be moved for zooming, and a third lens unit $G_3$ composed of a prism which has two reflecting surfaces and a positive refractive power, whereas the eyepiece lens system 2 consists of a fourth lens unit $G_4$ which is composed of a prism having two reflecting surfaces, and a fifth lens unit $G_5$ which has a positive refractive power and is to be kept stationary during zooming. Visual field frames (not shown) having sizes matched with the photographing modes are disposed on a surface of emergence of the third lens unit $G_3$.

The third embodiment, in which the first lens unit $G_1$ is to be moved for zooming along loci different between the usual photographing mode and the panoramic photographing mode, requires exchange of cams or equivalent means in conjunction with a variation of the airspace reserved between the first lens component $G_{1A}$ and the second lens component $G_{1B}$ in the first lens unit $G_1$. However, the third embodiment is advantageous for reducing manufacturing cost of the view-finder optical system since it permits reducing a number of lens element required to compose the objective lens system by comprising this lens system of two lens unit.

Figure 16G:
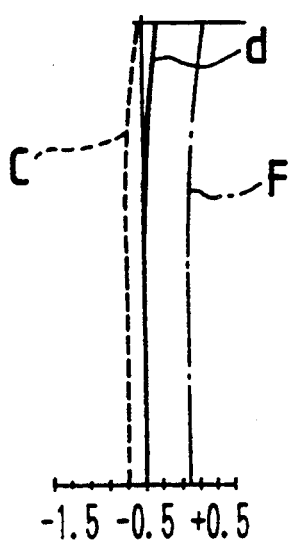
FIG. 16 shows curves visualizing aberration characteristics of the third embodiment of the present invention in the usual photographing mode thereof.
Figure 16H:
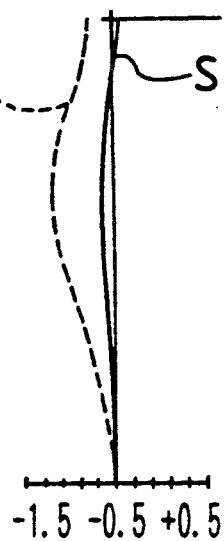
Figure 16I:
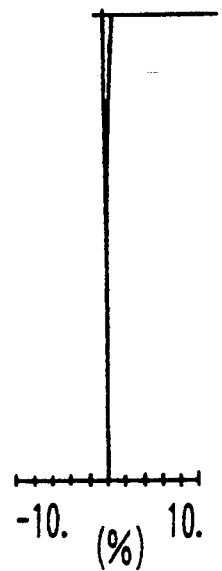
Figure 17A:
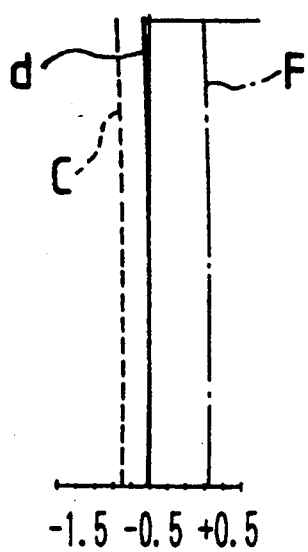
FIG. 17 shows graphs illustrating aberration characteristics of the third embodiment of the present invention in the panoramic photographing mode thereof.
Figure 17B:
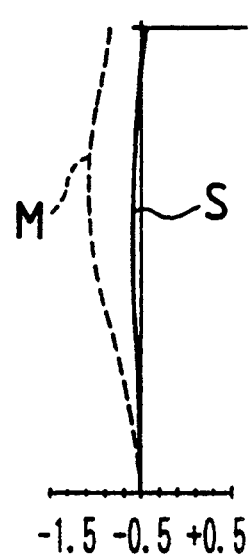
Figure 17C:
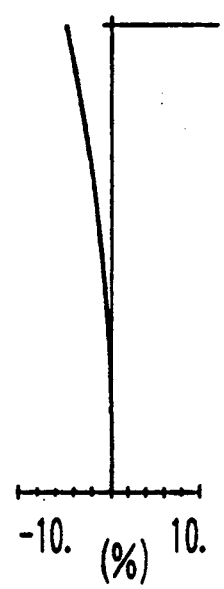
Figure 17D:
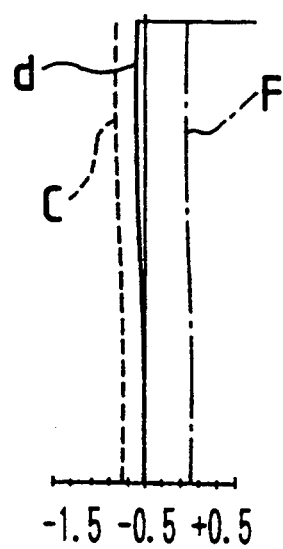
Figure 17E:
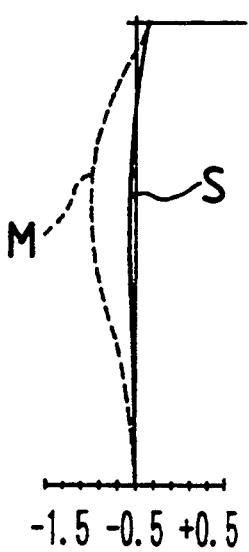
Figure 17F:
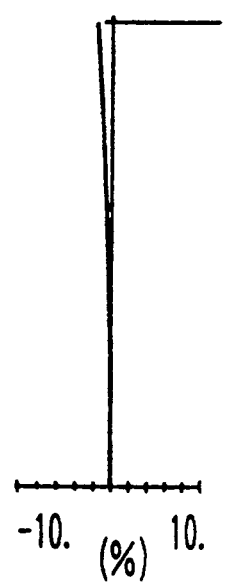
Figure 17G:
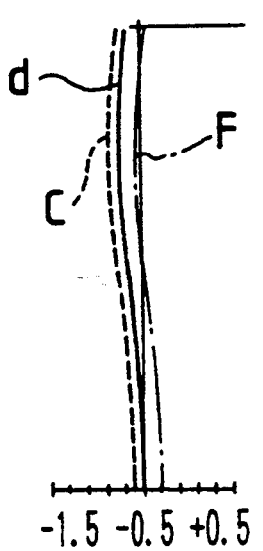
Figure 17H:
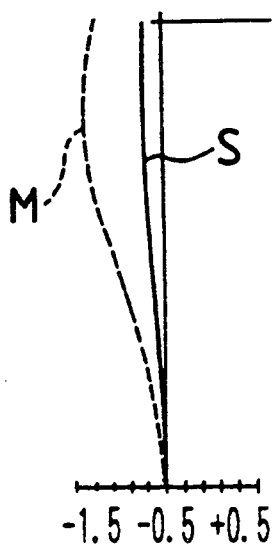
Figure 17I:
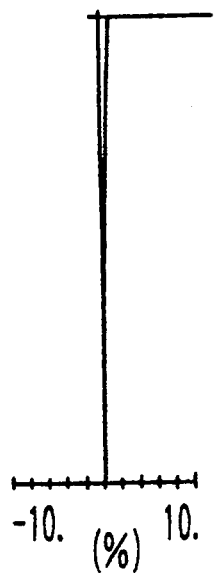

Numerical data for the development diagrams of the optical paths shown in FIG. 14 and FIG. 15 are listed below. Further, aberration characteristics at the wide position, middle position and telephoto position of the third embodiment in the usual photographing mode thereof are illustrated in FIG. 16, and those at the wide position, middle position and telephoto position of the optical system in the panoramic photographing mode are visualized in FIG. 17.

| <Usual photographing mode> | |
|---|---|
| Magnification | 0.42~0.55~0.73 |
| Angle of incidence (2ω) | 49.1°~37.3°~27.9° |
| <Panoramic photographing mode> | |
| Magnification | 0.50~0.66~0.88 |
| Angle of incidence (2ω) | 40.6°~29.1°~18.9° |
| Condition (4) | $(f_2 + d')/(f_2 + d) = 1.066$ |

| | | | |
|---|---|---|---|
| $r_1 = -10.9686$ | $d_1 = 1.000$ | $n_1 = 1.58423$ | $v_1 = 30.49$ |
| $r_2 = 7.4301$ (aspherical surface) | $d_2 = D_1$ (variable) | | |
| $r_3 = 14.9945$ (aspherical surface) | $d_3 = 2.000$ | $n_2 = 1.49241$ | $v_2 = 57.66$ |
| $r_4 = -16.6043$ | $d_4 = D_2$ (variable) | | |
| $r_5 = 14.9270$ | $d_5 = 3.500$ | $n_3 = 1.49241$ | $v_3 = 57.66$ |
| $r_6 = -20.8791$ (aspherical surface) | $d_6 = D_3$ (variable) | | |
| $r_7 = 21.2950$ | $d_7 = 20.000$ | $n_4 = 1.49241$ | $v_4 = 57.66$ |
| $r_8 = \infty$ | $d_8 = 1.000$ | | |
| $r_9 = \infty$ | $d_9 = 25.000$ | $n_5 = 1.49241$ | $v_5 = 57.66$ |
| $r_{10} = \infty$ | $d_{10} = 2.000$ | | |
| $r_{11} = 17.8960$ | $d_{11} = 3.400$ | $n_6 = 1.49241$ | $v_6 = 57.66$ |
| $r_{12} = -22.9520$ (aspherical surface) | $d_{12} = 20.000$ | | |
| $r_{13}$ (EP) | | | |

-continued

Aspherical surface coefficients
Second surface ($r_2$)
$P = 1.0000$          $A_4 = -0.10232 \times 10^{-2}$
$A_6 = -0.87306 \times 10^{-5}$   $A_8 = 0.57701 \times 10^{-6}$
Third surface ($r_3$)
$P = 1.0000$          $A_4 = -0.3075 \times 10^{-3}$
$A_6 = 0.43923 \times 10^{-5}$   $A_8 = -0.12541 \times 10^{-6}$
Sixth Surface ($r_6$)
$P = 1.0000$          $A_4 = 0.87143 \times 10^{-4}$
$A_6 = 0.49111 \times 10^{-6}$   $A_8 = -0.57315 \times 10^{-8}$
Seventh surface ($r_7$)
$P = 1.0000$          $A_4 = -0.15332 \times 10^{-3}$
$A_6 = 0.31536 \times 10^{-5}$   $A_8 = -0.66269 \times 10^{-7}$
Twelfth surface ($r_{12}$)
$P = 1.0000$          $A_4 = 0.79267 \times 10^{-4}$
$A_6 = -0.57040 \times 10^{-6}$   $A_8 = 0.68501 \times 10^{-8}$
Airspaces at different positions

TABLE 5

| | <Usual photographing mode> | | |
|---|---|---|---|
| | Wide angle position | Middle position | Telephoto position |
| $D_1$ | 1.0000 | 1.0000 | 1.0000 |
| $D_2$ | 19.5400 | 13.5227 | 8.3699 |
| $D_3$ | 10.9600 | 15.3178 | 22.1301 |

TABLE 6

| | <Panoramic photographing mode> | | |
|---|---|---|---|
| | Wide angle position | Middle position | Telephoto position |
| $D_1$ | 2.1511 | 2.1511 | 2.1511 |
| $D_2$ | 12.1701 | 6.1524 | 1.0000 |
| $D_3$ | 10.9600 | 15.3178 | 22.1301 |

Fourth Embodiment

Figure 18A:
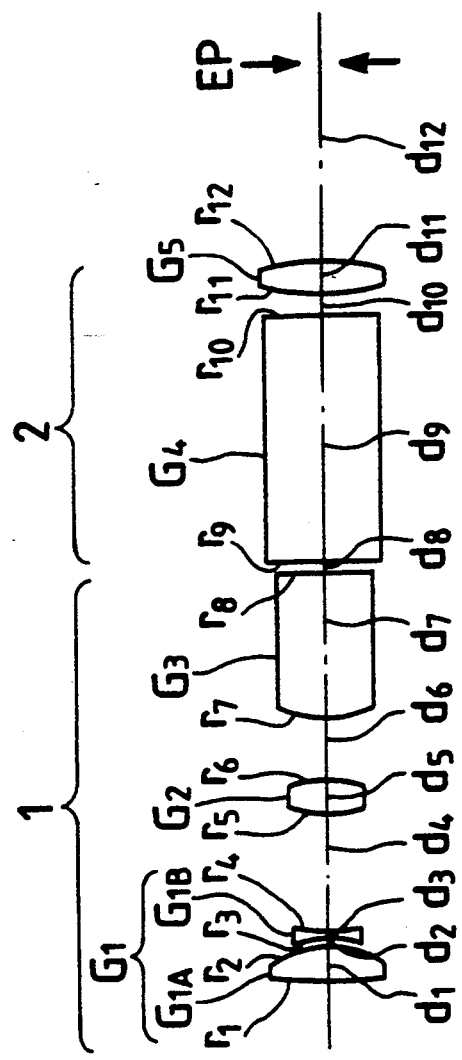
FIG. 18 shows development diagrams of optical paths at the wide position, middle position and telephoto position of a fourth embodiment of the real image type variable magnification view-finder optical system according to the present invention when it is set in the usual photographing mode.
Figure 18B:
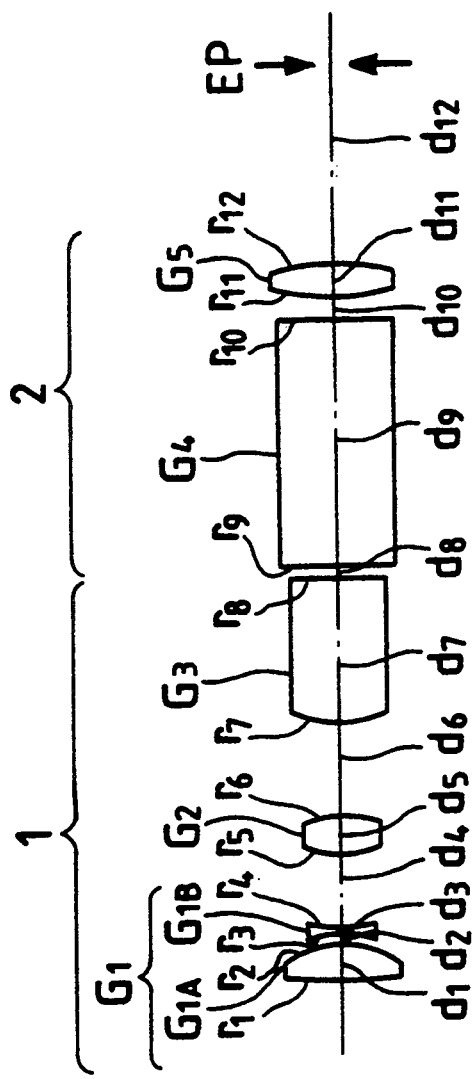
Figure 18C:
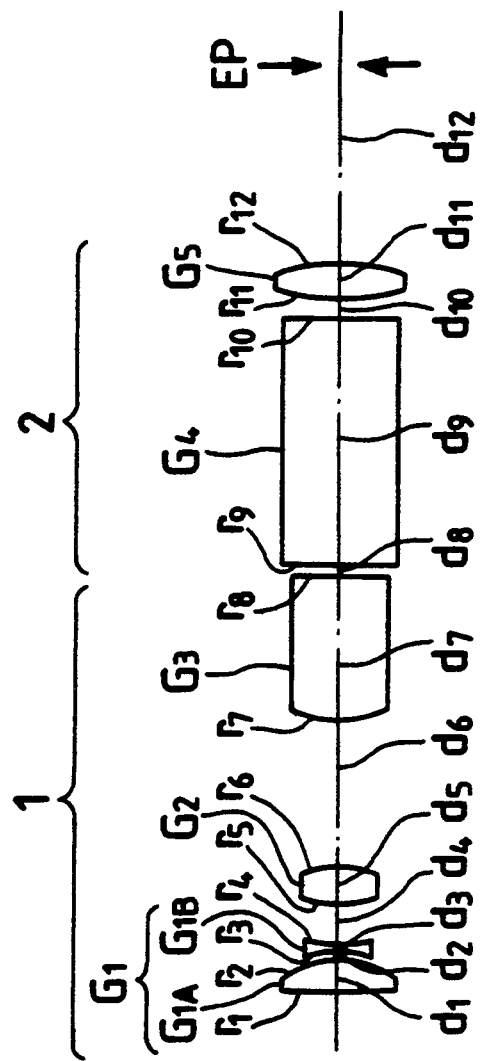
Figure 19A:
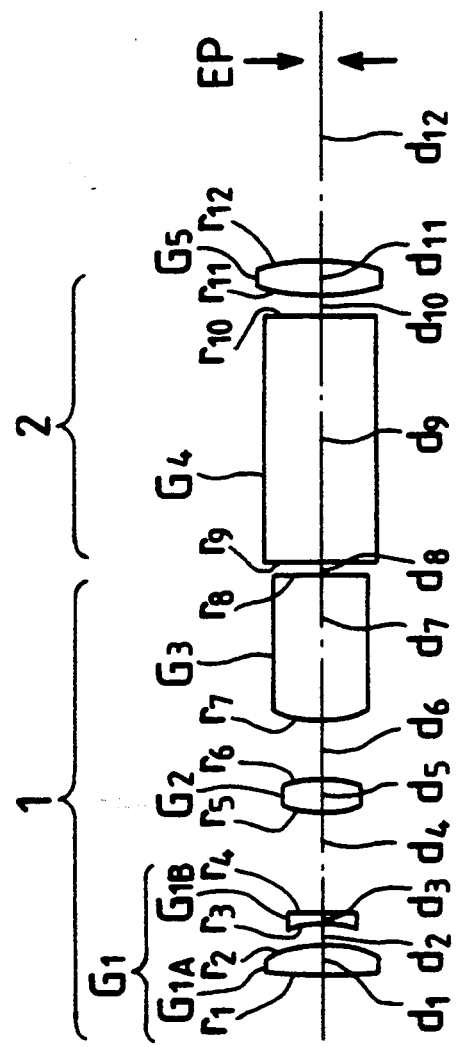
FIG. 19 shows development diagrams of optical paths at the wide position, middle position and telephoto position of the fourth embodiment of the present invention in the panoramic photographing mode thereof.
Figure 19B:
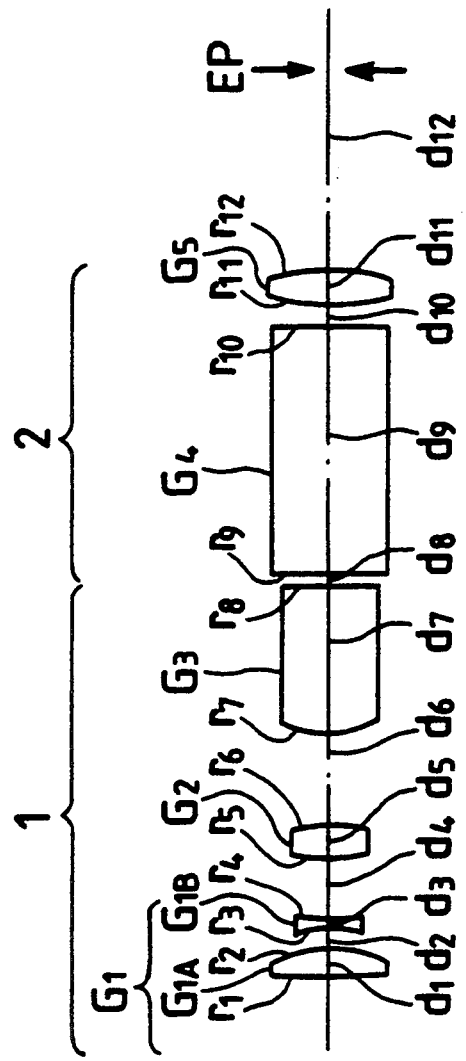
Figure 19C:
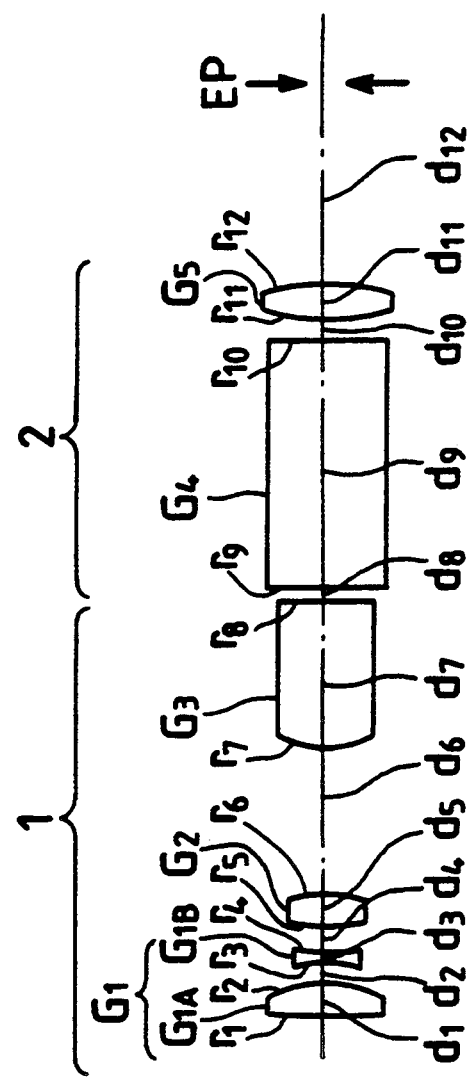
Figure 20A:
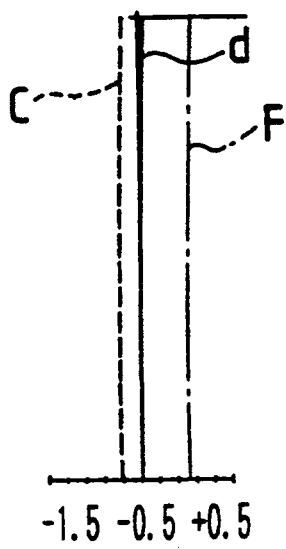
FIG. 20 shows graphs illustrating aberration characteristics of the fourth embodiment of the present invention in the usual photographing mode thereof.
Figure 20B:
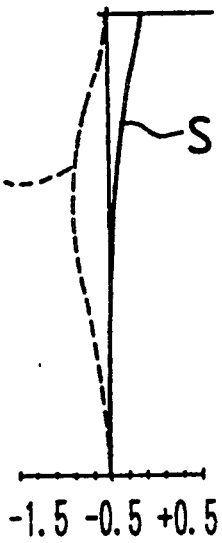
Figure 20C:
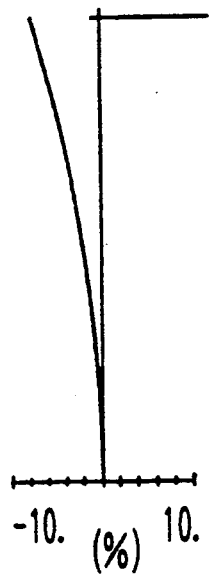
Figure 20D:
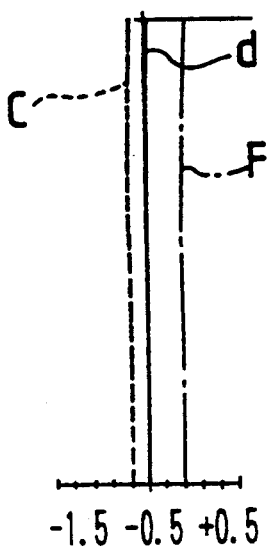
Figure 20E:
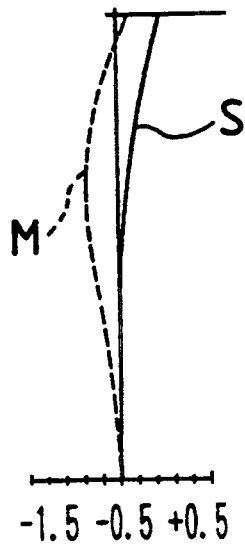
Figure 20F:
Figure 20G:
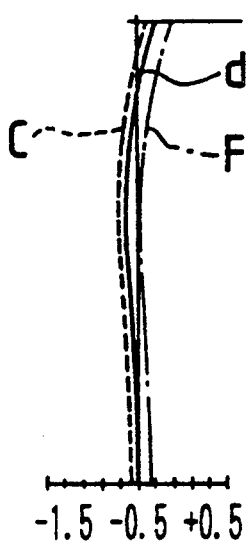
Figure 20H:
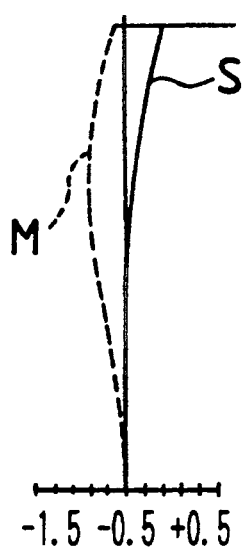
Figure 20I:
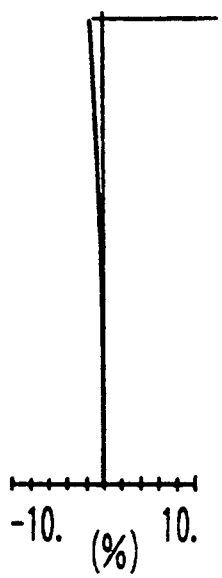
Figure 21A:
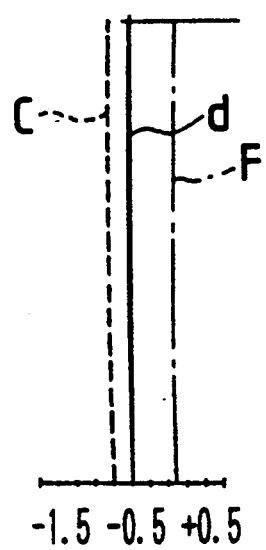
FIG. 21 shows curves illustrating aberration characteristics of the fourth embodiment of the present invention in the panoramic photographing mode thereof.
Figure 21B:
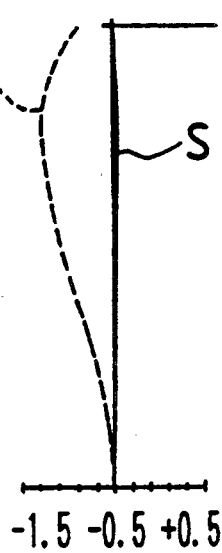
Figure 21C:
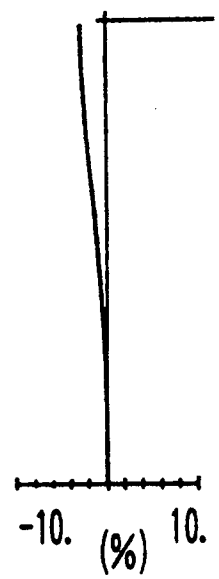
Figure 21D:
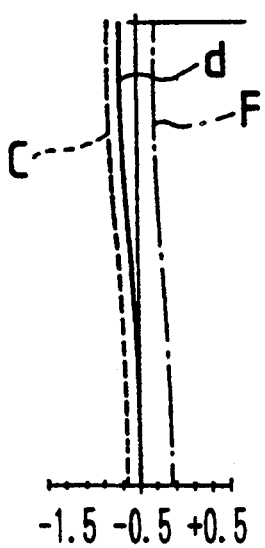
Figure 21E:
Figure 21F:
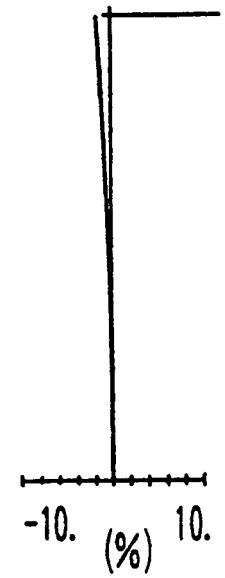
Figure 21G:
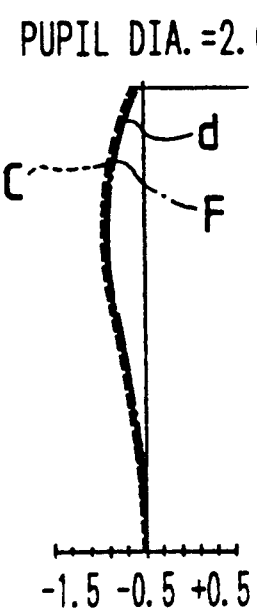
Figure 21H:
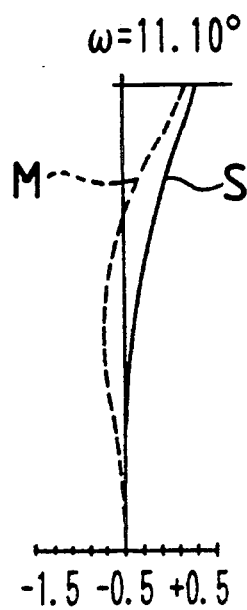
Figure 21I:
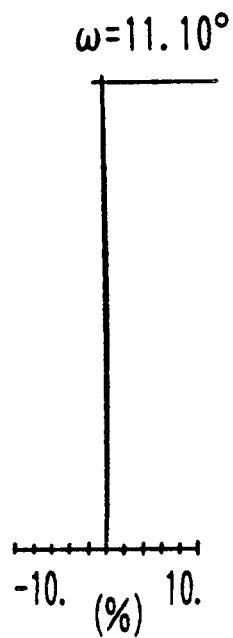

FIG. 18 and FIG. 19 are development diagrams illustrating optical paths at the wide position, middle position and telephoto position of the real image type variable magnification view-finder optical system preferred as the fourth embodiment of the present invention; FIG. 18 showing the optical paths in the usual photographing mode and FIG. 19 illustrating the optical paths in the panoramic photographing mode. This view-finder optical system consists of an objective lens system 1 and an eyepiece lens system 2. The objective lens system I consists of a first lens unit $G_1$ which is composed of a first lens component $G_{1A}$ having a positive refractive power and a second lens component $G_{1B}$ having a negative refractive power, has a negative refractive power as a whole, and is to be moved for zooming, a second lens unit $G_2$ which has a positive refractive power and is to be moved for zooming, and a third lens unit $G_3$ composed of a prism which has two reflecting surfaces and a positive refractive power, whereas the eyepiece lens system 2 consists of a fourth lens unit $G_4$ which is composed of a prism having two reflecting surfaces and a fifth lens unit $G_5$ which has a positive refractive power and is to be moved for zooming. Visual field frames (not shown) having sizes matched with the photographing modes are disposed on a surface of emergence of the third lens unit $G_3$.

The fourth embodiment exhibits an effect to shorten a total length of the objective lens system since this embodiment permits moving the first lens unit $G_1$ for a distance shorter than that required for moving the first lens unit in the third embodiment.

Numerical data for the development diagrams of the optical paths shown in FIG. 18 and FIG. 19 are listed below. Further, aberration characteristics at the wide position, middle position and telephoto position of the fourth embodiment in the usual photographing mode thereof are illustrated in FIG. 20, whereas those at the wide position, middle position and telephoto position of the optical system in the panoramic photographing mode are visualized in FIG. 21.

<Usual photographing mode>
Magnification            $0.42 \sim 0.55 \sim 0.73$
Angle of incidence ($2\omega$)    $45.4° \sim 34.3° \sim 24.3°$
<Panoramic photographing mode>
Magnification            $0.50 \sim 0.66 \sim 0.88$
Angle of incidence ($2\omega$)    $40.5° \sim 30.9° \sim 22.2°$
Condition (4)            $(f_2 + d')/(f_2 + d) = 1.066$ $r_1 = 185.9539$   $d_1 = 3.000$   $n_1 = 1.49241$   $\nu_1 = 57.66$
$r_2 = -8.5090$   $d_2 = D_1$
(aspherical surface) (variable)
$r_3 = -8.8396$   $d_3 = 1.000$   $n_2 = 1.58423$   $\nu_2 = 30.49$
(aspherical surface)
$r_4 = 10.9966$   $d_4 = D_2$
(aspherical surface) (variable)
$r_5 = 12.3310$   $d_5 = 3.500$   $n_3 = 1.49241$   $\nu_3 = 57.66$
$r_6 = -13.9658$   $d_6 = D_3$
(aspherical surface) (variable)
$r_7 = 11.3161$   $d_7 = 15.089$   $n_4 = 1.49241$   $\nu_4 = 57.66$
$r_8 = \infty$   $d_8 = 1.000$
$r_9 = \infty$   $d_9 = 25.000$   $n_5 = 1.49241$   $\nu_5 = 57.66$
$r_{10} = \infty$   $d_{10} = 2.000$
$r_{11} = 17.8960$   $d_{11} = 3.400$   $n_6 = 1.49241$   $\nu_6 = 57.66$
$r_{12} = -22.9520$   $d_{12} = 20.000$
(aspherical surface)
$r_{13} = (EP)$ Aspherical surface coefficients
Second surface ($r_2$)
$P = 1.0000$          $A_4 = 0.81532 \times 10^{-3}$
$A_6 = -0.77316 \times 10^{-5}$   $A_8 = 0.98127 \times 10^{-7}$
Fourth surface ($r_4$)
$P = 1.0000$          $A_4 = -0.65420 \times 10^{-3}$
$A_6 = -0.12246 \times 10^{-3}$   $A_8 = 0.65356 \times 10^{-5}$
Sixth Surface ($r_6$)
$P = 1.0000$          $A_4 = 0.18039 \times 10^{-3}$
$A_6 = 0.51652 \times 10^{-5}$   $A_8 = -0.85054 \times 10^{-7}$
Seventh surface ($r_7$)
$P = 1.0000$          $A_4 = -0.13609 \times 10^{-3}$
$A_6 = 0.49750 \times 10^{-5}$   $A_8 = -0.10119 \times 10^{-6}$
Twelfth surface ($r_{12}$)
$P = 1.0000$          $A_4 = 0.79267 \times 10^{-4}$
$A_6 = -0.57040 \times 10^{-6}$   $A_8 = 0.68501 \times 10^{-8}$
Airspaces at different positions

TABLE 7

| | <Usual photographing mode> | | |
|---|---|---|---|
| | Wide angle position | Middle position | Telephoto position |
| $D_1$ | 1.0000 | 1.0000 | 1.0000 |
| $D_2$ | 11.7890 | 7.6030 | 4.0313 |
| $D_3$ | 5.8928 | 9.5264 | 15.2150 |

TABLE 8

| | <Panoramic photographing mode> | | |
|---|---|---|---|
| | Wide angle position | Middle position | Telephoto position |
| $D_1$ | 2.1672 | 2.1672 | 2.1672 |
| $D_2$ | 9.9007 | 5.7250 | 2.1449 |
| $D_3$ | 5.8928 | 9.5264 | 15.2150 |

Fifth Embodiment

Figure 22C:
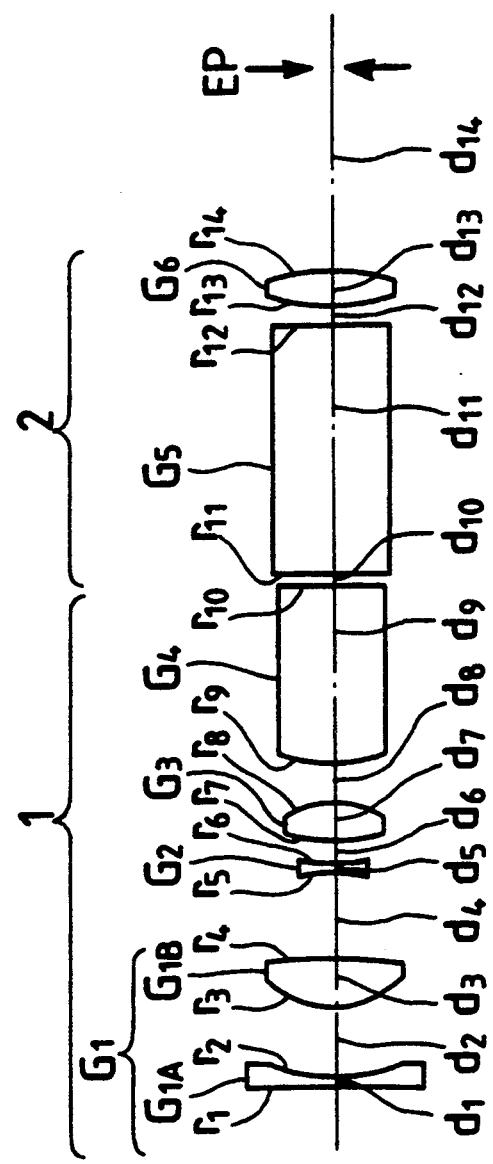
FIG. 22 shows development diagrams of optical paths at the wide position, middle position and telephoto position of a fifth embodiment of the real image type variable magnification view-finder optical system according to the present invention when it is set in the usual photographing mode.
Figures 23A, 23B:
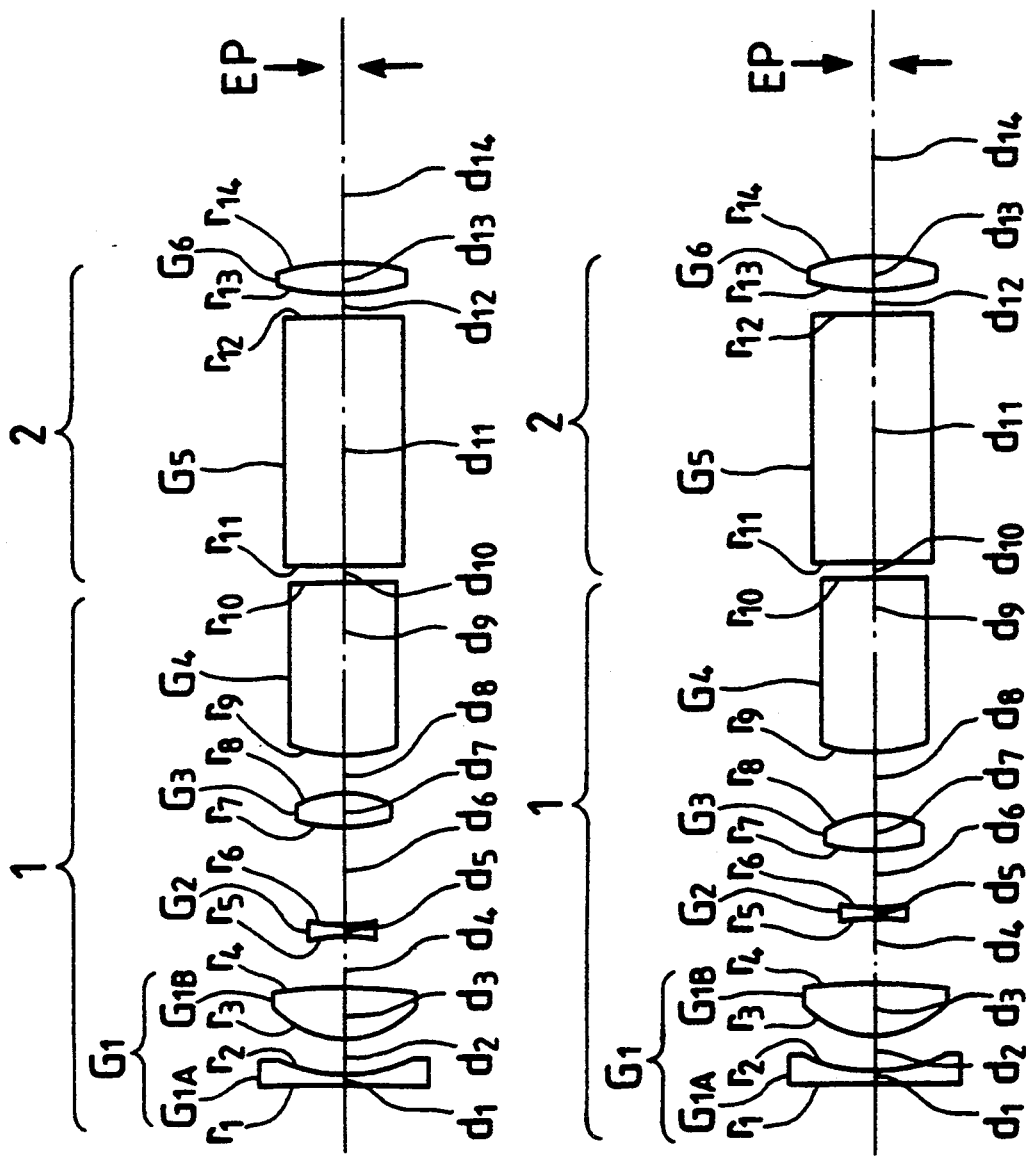
FIG. 23 shows development diagrams of optical paths at the wide position, middle position and telephoto position of the fifth embodiment of the present invention when it is set in the panoramic photographing mode.
Figure 23C:
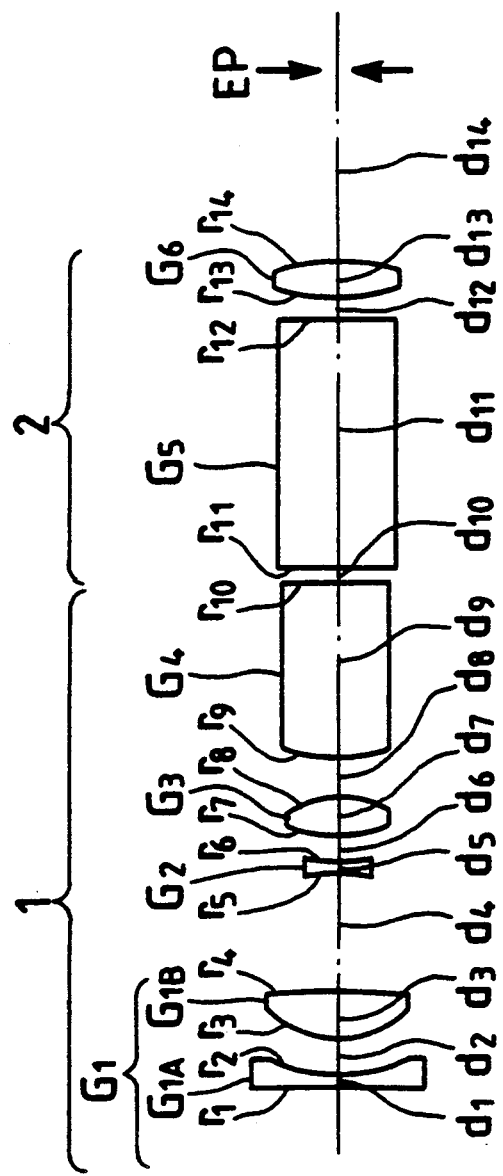
Figure 24A:
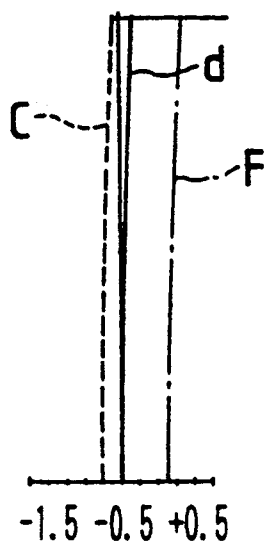
FIG. 24 shows graphs visualizing aberration characteristics of the fifth embodiment of the present invention in the usual photographing mode thereof.
Figure 24B:
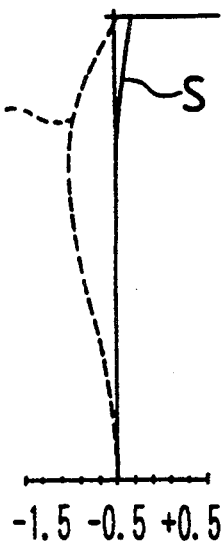
Figure 24C:
Figure 24D:
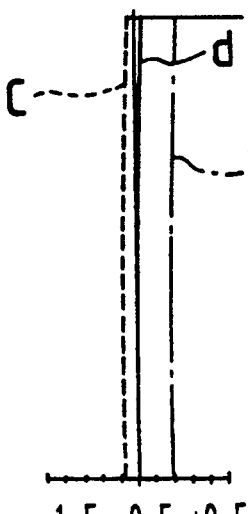
Figure 24E:
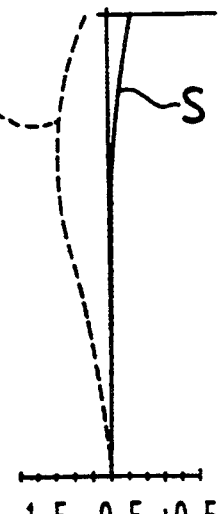
Figure 24F:
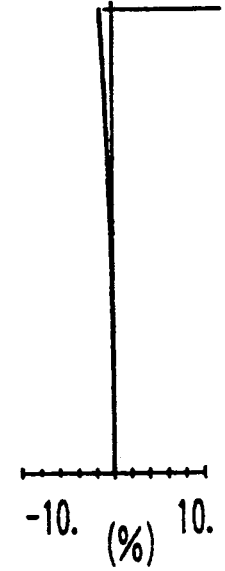
Figure 24G:
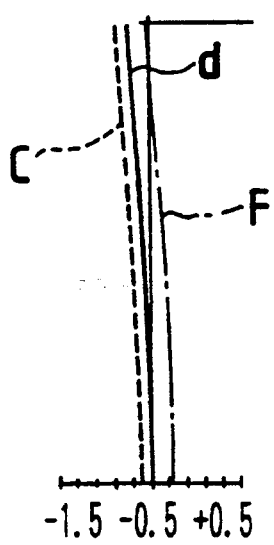
Figure 24H:
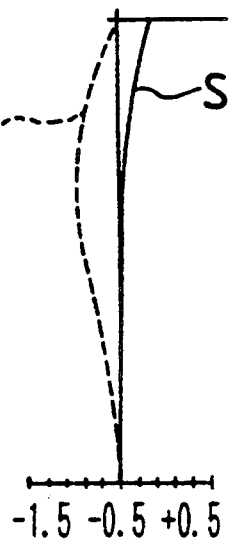
Figure 24I:
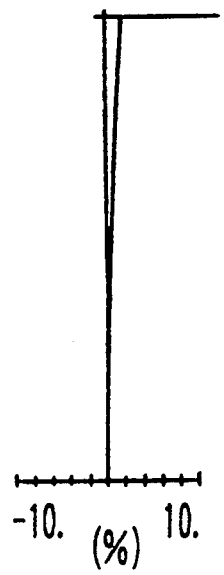
Figure 25A:
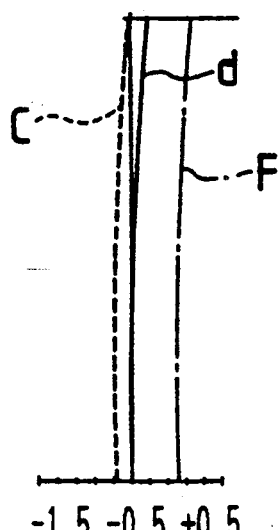
FIG. 25 shows curves illustrating aberration characteristics of the fifth embodiment of the present invention in the panoramic photographing mode thereof.
Figure 25B:
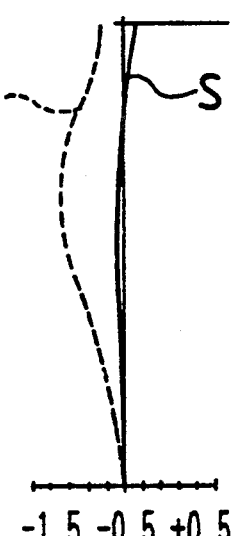
Figure 25C:
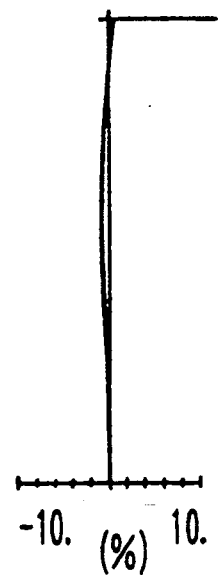
Figure 25D:
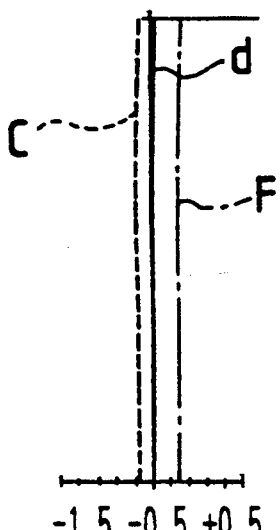
Figure 25E:
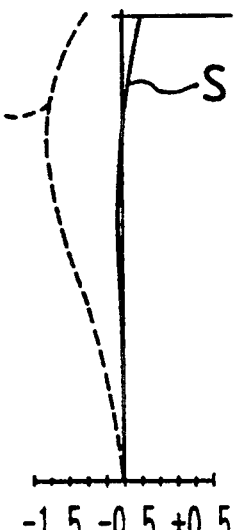
Figure 25F:
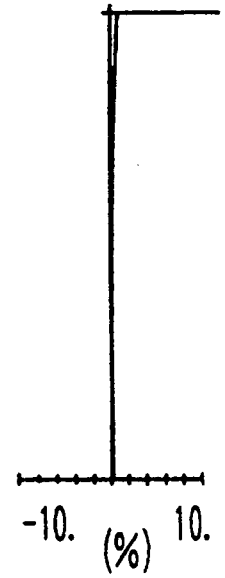
Figure 25G:
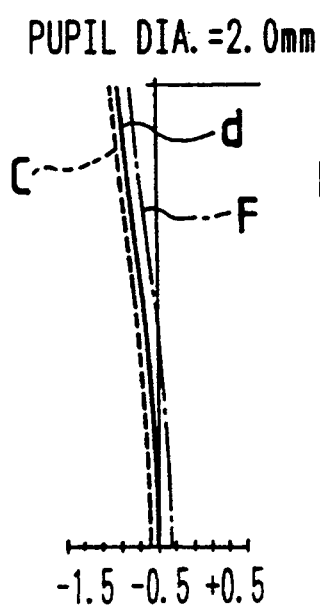
Figure 25H:
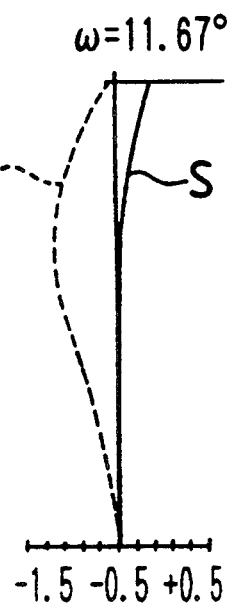
Figure 25I:
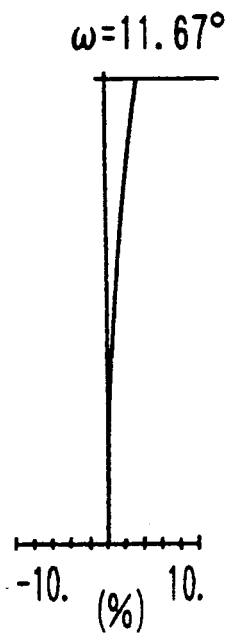

FIG. 22 and 23 show development diagrams of optical paths at the wide position, middle position and telephoto position of the real image type variable magnification view-finder optical system preferred as the fifth embodiment of the present invention; FIG. 22 showing the optical paths in the usual photographing mode and FIG. 23 showing the optical paths in the panoramic photographing mode. In contrast to the first through fourth embodiments each of which uses the lens unit which is composed of two or more lens components and has a negative total focal length, the fifth embodiment adopts a lens unit which is composed of two lens components and has a positive focal length.

The view-finder optical system preferred as the fifth embodiment consists of an objective lens system 1 and an eyepiece lens system 2. The objective lens system 1 consists of a first fixed lens unit $G_1$ which is composed of a first lens component $G_{1A}$ having a negative refractive power and a second lens component $G_{1B}$ having a positive refractive power, and has a positive refractive power as a whole, a second movable lens unit $G_2$ which has a negative refractive power and is movable for zooming, a third movable lens unit $G_3$ which has a positive refractive power and is movable for zooming, and a fourth lens unit $G_4$ composed of a prism which has two reflecting surfaces and has a positive refractive power, whereas the eyepiece lens system 2 consists of a fifth lens unit $G_5$ composed of a prism which has two reflecting surfaces, and a sixth fixed lens unit $G_6$ having a positive refractive power. In addition, visual field frame (not shown) having sizes matched with the photographing modes are disposed on a surface of emergence of the fourth lens unit $G_4$.

Even when the first lens unit $G_1$ is configured so as to have a positive focal length, the fifth embodiment can provide an effect which is similar to that obtained by the first embodiment.

Numerical data for the development diagrams of the optical paths shown in FIG. 22 and FIG. 23 are listed below. Further, aberration characteristics at the wide position, middle position and telephoto position of the fifth embodiment in the usual photographing mode are visualized in FIG. 24, whereas those at the wide position, middle position and telephoto position of the optical system in the panoramic photographing mode are illustrated in FIG. 25.

| <Usual photographing mode> | | | |
|---|---|---|---|
| Magnification | 0.40~0.54~0.73 | | |
| Angle of incidence (2ω) | 46.2°~34.1°~24.9° | | |
| <Panoramic photographing mode> | | | |
| Magnification | 0.48~0.65~0.88 | | |
| Angle of incidence (2ω) | 41.4°~31.2°~23.3° | | |
| Condition (4) | $(f_2 + d')/(f_2 + d) = 1.154$ | | |
| Condition (5) | $m_{27}/m_{2W} - m_{37}/m_{3W} = 0.709$ | | |
| $r_1 = \infty$ | $d_1 = 1.000$ | $n_1 = 1.58423$ | $\nu_1 = 30.49$ |
| $r_2 = 13.5822$ | $d_2 = D_1$ | | |
| (aspherical surface) | (variable) | | |
| $r_3 = 9.7215$ | $d_3 = 5.000$ | $n_2 = 1.49241$ | $\nu_2 = 57.66$ |
| (aspherical surface) | | | |
| $r_4 = -25.9373$ | $d_4 = D_2$ | | |
| (aspherical surface) | (variable) | | |
| $r_5 = -11.4264$ | $d_5 = 1.000$ | $n_3 = 1.58423$ | $\nu_3 = 30.49$ |
| $r_6 = 12.5574$ | $d_6 = D_3$ | | |
| (aspherical surface) | (variable) | | |
| $r_7 = 17.6116$ | $d_7 = 3.500$ | $n_4 = 1.49241$ | $\nu_4 = 57.66$ |
| $r_8 = -9.5224$ | $d_8 = D_4$ | | |
| (aspherical surface) | | | |
| $r_9 = 15.3852$ | $d_9 = 18.026$ | $n_5 = 1.49241$ | $\nu_5 = 57.66$ |
| $r_{10} = \infty$ | $d_{10} = 1.000$ | | |
| $r_{11} = \infty$ | $d_{11} = 25.000$ | $n_6 = 1.49241$ | $\nu_6 = 57.66$ |
| $r_{12} = \infty$ | $d_{12} = 2.000$ | | |
| $r_{13}\ 17.8960$ | $d_{13} = 3.400$ | $n_7 = 1.49241$ | $\nu_7 = 57.66$ |
| $r_{14} = -22.9520$ | $d_{14} = 20.000$ | | |
| (aspherical surface) | | | |
| $r_{15}$ (EP) | | | |

Aspherical surface coefficients
Second surface ($r_2$)
P = 1.0000  $A_4 = -0.91356 \times 10^{-4}$
$A_6 = -0.13485 \times 10^{-5}$  $A_8 = 0.24772 \times 10^{-8}$
Fourth surface ($r_4$)
P = 1.0000  $A_4 = 0.34207 \times 10^{-3}$
$A_6 = -0.12533 \times 10^{-5}$  $A_8 = 0.12538 \times 10^{-7}$
Sixth Surface ($r_6$)
P = 1.0000  $A_4 = -0.22452 \times 10^{-3}$
$A_6 = -0.72786 \times 10^{-5}$  $A_8 = 0.26251 \times 10^{-6}$
Eighth surface ($r_8$)
P = 1.0000  $A_4 = 0.22498 \times 10^{-3}$
$A_6 = 0.25188 \times 10^{-6}$  $A_8 = 0.62442 \times 10^{-7}$
Fourteenth surface ($r_{14}$)
P = 1.0000  $A_4 = 0.79267 \times 10^{-4}$
$A_6 = -0.57040 \times 10^{-6}$  $A_8 = 0.68501 \times 10^{-8}$
Airspaces at different positions

TABLE 9

| | <Usual photographing mode> | | |
|---|---|---|---|
| | Wide angle position | Middle position | Telephoto position |
| $D_1$ | 6.4133 | 6.4133 | 6.4133 |
| $D_2$ | 3.0546 | 4.1030 | 9.0351 |
| $D_3$ | 9.6123 | 5.5025 | 2.7104 |
| $D_4$ | 3.4238 | 6.4852 | 4.3452 |

TABLE 10

| | <Panoramic photographing mode> | | |
|---|---|---|---|
| | Wide angle position | Middle position | Telephoto position |
| $D_1$ | 3.8060 | 3.8060 | 3.8060 |
| $D_2$ | 6.0391 | 7.0876 | 12.0197 |
| $D_3$ | 9.6123 | 5.5025 | 2.7104 |
| $D_4$ | 3.4238 | 6.4852 | 4.3452 |

In the embodiments of the present invention described above, the reference symbols $r_1, r_2, \ldots$ represents radii of curvature on surface of the respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, and the reference symbols $\nu_1, \nu_2, \ldots$ represent Abbe's numbers of the respective lens components.

The aspherical surfaces used in the embodiments of the present invention have shapes which are expressed by the following formula using the aspherical surface coefficients described above, and taking a direction of the optical axis as the Z axis and a direction perpendicular to the optical axis as the Y axis:

$$Z = \frac{CY^2}{1 + \sqrt{1 - PC^2Y^2}} + A_4Y^4 + A_6Y^6 + A_8Y^8$$

wherein the reference symbol R represents a paraxial radius of curvature, the reference symbol P designates a conical coefficient, the reference symbol $A_4$ denotes an aspherical surface coefficient of the term of the fourth order, the reference symbol $A_6$ represents an aspherical surface coefficient of the term of the sixth order, the reference symbol $A_8$ designates an aspherical surface coefficient of the term of the eighth order and the reference symbol C denotes 1/R.

What is claimed is:

1. A real image type variable magnification view-finder optical system comprising:

an objective lens system comprising a plurality of lens units and having a positive refractive power as a whole, and an eyepiece lens system for allowing observation of an image formed by said objective lens system;

wherein a magnification of said view-finder optical system is changed over an entire zooming range from a wide position to a telephoto position thereof by varying at least one of airspaces reserved in said plurality of lens units, wherein at least one of said plurality of lens units comprises two or more lens components and wherein a change of magnification is performed for switching between a usual photographing mode and a panoramic photographing mode by varying at least one of airspaces reserved between said two or more lens components.

2. A real image type variable magnification view-finder optical system according to claim 1 wherein one of said plurality of lens units is used as a vari-focal lens unit, and wherein this lens unit comprises a front lens component and a rear lens component, and satisfies the following condition where $f>0$, $f_1<0$, and $f_2>0$:

$$(f_1+d')/(f_1+d)>1.02$$

$$[f>0 \text{ and } f_1<0, f_2>0]$$

$$[f<0 \text{ and } f_1<0, f_2<0]$$

wherein the reference symbol $f_1$ represents a focal length of the front lens component, the reference symbol $f_2$ designates a focal length of the rear lens component, the reference symbol f denotes a total focal length of said vari-focal lens unit, the reference symbol d represents an airspace reserved between said lens components at a low magnification level, and the reference symbol $d^1$ designates an airspace reserved between said lens components at a high magnification level.

3. A real image type variable magnification view-finder optical system according to claim 1 wherein one of said plurality of lens units is used as a vari-focal lens unit and wherein this lens unit comprises a front lens component and a rear lens component, and satisfies the following condition where $f>0$, $f_1>0$, and $f_2<0$:

$$(f_2+d')/(f_2+d)>1.02$$

$$[f>0 \text{ and } f_1>0, f_2<0]$$

$$[f<0 \text{ and } f_1, 0, f_2>0]$$

wherein the reference symbol $f_1$ represents a focal length of the front lens component, the reference symbol $f_2$ designates a focal length of the rear lens component, the reference symbol f denotes a total focal length of said vari-focal lens unit, the reference symbol d represents an airspace reserved between the lens components at a low magnification level, and the reference symbol $d^1$ designates an airspace reserved between the lens components at a high magnification level.

4. A real image type variable magnification view-finder optical system according to claim 1 wherein said objective lens system comprises a first fixed lens unit, a second movable lens unit and a third movable lens unit, and wherein said first lens unit comprises a plurality of lens components to be used for changing a magnification and satisfies the following condition:

$$m_{2T}/m_{2W}-m_{3T}/m_{3W}>0$$

wherein the reference symbol $m_{2W}$ represents a magnification of the second lens unit at a wide position of said view-finder optical system, the reference symbol $m_{2T}$ designates a magnification of the second lens unit at a telephoto position of said view-finder optical system, the reference symbol $m_{3W}$ denotes a magnification of the third lens unit at the wide position of said view-finder optical system and the reference symbol $m_{3T}$ represents a magnification of the third lens unit at the telephoto position of said view-finder optical system.

5. A real image type variable magnification view-finder optical system comprising:

an objective lens system comprising a plurality of lens units and having a positive refractive power as a whole, and an eyepiece lens system for allowing observation of an image formed by said objective lens system;

wherein a magnification of said view-finder optical system is changed over an entire zooming range from a wide position to a telephoto position thereof by varying at least one of airspaces reserved in said plurality of lens units, wherein a lens unit disposed on the object side, out of said plurality of lens units, comprises a positive lens component and a negative lens component, and wherein a change of a magnification for switching between a usual photographing mode and a panoramic photographing mode is performed over an entire zooming range by varying an airspace reserved between said positive lens component and said negative lens component.

6. A real image type variable magnification view-finder optical system comprising:

an objective lens system comprising a plurality of lens units and having a positive refractive power as a whole, and an eyepiece lens system for allowing observation of an image formed by said objective lens system;

wherein a magnification of said view-finder optical system is changed over an entire zooming range from a wide position to a telephoto position thereof by varying at least one of airspaces reserved in said plurality of lens units, wherein a lens unit disposed on the object side, out of said plurality of lens units, comprises a plurality of lens components, and wherein a change of a magnification for switching between a usual photographing mode and a panoramic photographing mode is performed over an entire zooming range by varying one or more airspaces reserved between said plurality of lens components.

7. A real image type variable magnification view-finder optical system according to claim 1 wherein one of said plurality of lens units is used as a vari-focal lens unit, and wherein this lens unit comprises a front lens component and a rear lens component, and satisfies the following condition where $f<0$, $f_1>0$, and $f_2<0$:

$$(f_1+d')/(f_1+d) > 1.02$$

wherein the reference symbol $f_1$ represents a focal length of the front lens component, the reference symbol $f_2$ designates a focal length of the rear lens component, the reference symbol f denotes a total focal length of said vari-focal lens unit, the reference symbol d represents an airspace reserved between said lens components at a low magnification level, and the reference symbol $d^1$ designates an airspace reserved between said lens components at a high magnification level.

8. A real image type variable magnification viewfinder optical system according to claim 1 wherein one of said plurality of lens units is used as a vari-focal lens unit and wherein this lens unit comprises a front lens component and a rear lens component, and satisfies the following condition where $f<0$ and $f_1<0$, $f_2>0$:

$$(f_2+d')/(f_2+d) > 1.02$$

wherein the reference symbol $f_1$ represents a focal length of the front lens component, the reference symbol $f_1$ designates a focal length of the rear lens component, the reference symbol f denotes a total focal length of said vari-focal lens unit, the reference symbol d represents an airspace reserved between the lens components at a low magnification level, and the reference symbol $d^1$ designates an airspace reserved between the lens components at a high magnification level.

* * * * *